United States Patent
May et al.

(10) Patent No.: US 12,458,135 B2
(45) Date of Patent: Nov. 4, 2025

(54) TOOTHBRUSH SYSTEM

(71) Applicant: QUIP NYC INC., Brooklyn, NY (US)

(72) Inventors: William Thomas May, South Orange, NJ (US); Simon Enever, Brooklyn, NY (US); Paul Koh, New York, NY (US); John Dey, Brooklyn, NY (US); Zachary Zaro, Brooklyn, NY (US); Andrew McLeod, Brooklyn, NY (US); Fernando D. Paredes, Brooklyn, NY (US); Donald J. Deficcio, II, Brooklyn, NY (US); William M. Sakran, Brooklyn, NY (US)

(73) Assignee: Quip NYC Inc., Brooklyn, NY (US)

( * ) Notice: Subject to any disclaimer, the term of this patent is extended or adjusted under 35 U.S.C. 154(b) by 490 days.

(21) Appl. No.: 17/728,409

(22) Filed: Apr. 25, 2022

(65) Prior Publication Data

US 2022/0240661 A1    Aug. 4, 2022

Related U.S. Application Data

(63) Continuation of application No. PCT/US2020/070693, filed on Oct. 26, 2020.
(Continued)

(51) Int. Cl.
*A46B 15/00* (2006.01)

(52) U.S. Cl.
CPC ...... *A46B 15/0006* (2013.01); *A46B 15/0038* (2013.01)

(58) Field of Classification Search
CPC ........ A46B 15/0006; A46B 2200/1066; A46B 15/004; A46B 15/0012; A46B 15/0044; A46B 15/0008; A46B 15/003815; A46B 15/167; A61C 17/3445; A61C 17/3472; A61C 17/3418; A61C 17/3481; A61C 17/221; B29L 2031/425; G09B 19/0084
See application file for complete search history.

(56) References Cited

U.S. PATENT DOCUMENTS

| | | | |
|---|---|---|---|
| 11,941,997 B2* | 3/2024 | Ogunsina | A46B 15/0002 |
| 2009/0291422 A1* | 11/2009 | Puurunen | A46B 15/0002 434/263 |

(Continued)

FOREIGN PATENT DOCUMENTS

| | | |
|---|---|---|
| CN | 106806032 A | 9/2017 |
| EP | 3522752 A1 | 8/2019 |

(Continued)

OTHER PUBLICATIONS

Chinese Intellectual Property Office, "First Office Action", issued in related Chinese Patent Application No. 202080074713.6, dated Feb. 8, 2024, including English translation (10 pages).
(Continued)

*Primary Examiner* — Katina N. Henson
(74) *Attorney, Agent, or Firm* — ArentFox Schiff LLP

(57) ABSTRACT

A toothbrush apparatus, a method, and a medical system. The apparatus includes a sensing module configured to detect one or more brushing parameters for determining at least a brushing intensity. One or more processors are communicatively coupled to the sensing module and are configured to determine at least the brushing intensity and output the determined brushing intensity.

15 Claims, 13 Drawing Sheets

Related U.S. Application Data

(60) Provisional application No. 63/062,979, filed on Aug. 7, 2020, provisional application No. 62/926,212, filed on Oct. 25, 2019.

(56) References Cited

U.S. PATENT DOCUMENTS

| | | | |
|---|---|---|---|
| 2018/0132603 A1 | 5/2018 | Gatzemeyer et al. | |
| 2019/0228819 A1* | 7/2019 | Yin | G06F 1/24 |
| 2019/0231063 A1* | 8/2019 | May | A46B 15/0044 |

FOREIGN PATENT DOCUMENTS

| | | | | |
|---|---|---|---|---|
| JP | 2000183654 A | * | 6/2000 | |
| WO | WO-2016025360 A1 | * | 2/2016 | F16K 37/00 |

OTHER PUBLICATIONS

Canadian Intellctual Property Office, "Office Action", issued in related Canadian Patent Application No. 3153335, dated Jun. 9, 2023, (4 pages).

Intellectual Property India, "First Examination Report", issued in related Indian Patent Application No. 202247027622, dated Jul. 12, 2022, (6 pages).

PCT; International Searching Authority; International Application No. PCT/US2020/70693; International Preliminary Report on Patentability; issued Apr. 26, 2022; 10 pages.

PCT; International Searching Authority; International Application No. PCT/US2020/70693; Search Report and Written Opinion mailed Mar. 15, 2021; 15 pages.

* cited by examiner

| Event Time | Motor On/Off |
|---|---|
| 0 minutes 0 Seconds | ON |
| 0 minutes 29.6 Seconds | OFF |
| 0 minutes 30 Seconds | ON |
| 0 Minutes 59.6 Seconds | OFF |
| 1 Minutes 0 Seconds | ON |
| 1 Minutes 29.6 Seconds | OFF |
| 1 Minutes 30 Seconds | ON |
| 1 Minutes 59.6 Seconds | OFF |
| 2 Minutes 0.045 Seconds | ON |
| 2 Minutes 0.255 Seconds | OFF |
| 2 Minutes 0.655 Seconds | ON |
| 2 Minutes 0.865 Seconds | OFF |
| 2 Minutes 1.265 Seconds | ON |
| 2 Minutes 1.475 Seconds | OFF |

| Event Time | Motor On/Off |
|---|---|
| 0 Seconds | ON |
| 0.105 Seconds | OFF |
| 0.305 Seconds | ON |
| 0.410 Seconds | OFF |
| 0.610 Seconds | ON |
| 0.715 Seconds | OFF |
| 0.915 Seconds | ON |
| 1.02 Seconds | OFF |
| 1.22 Seconds | ON |
| 1.325 Seconds | OFF |
| 1.525 Seconds | ON |
| 1.63 Seconds | OFF |
| 1.83 Seconds | ON |
| 1.935 Seconds | OFF |
| 2.135 Seconds | ON |
| 2.24 Seconds | OFF |

602

Figure 6C:
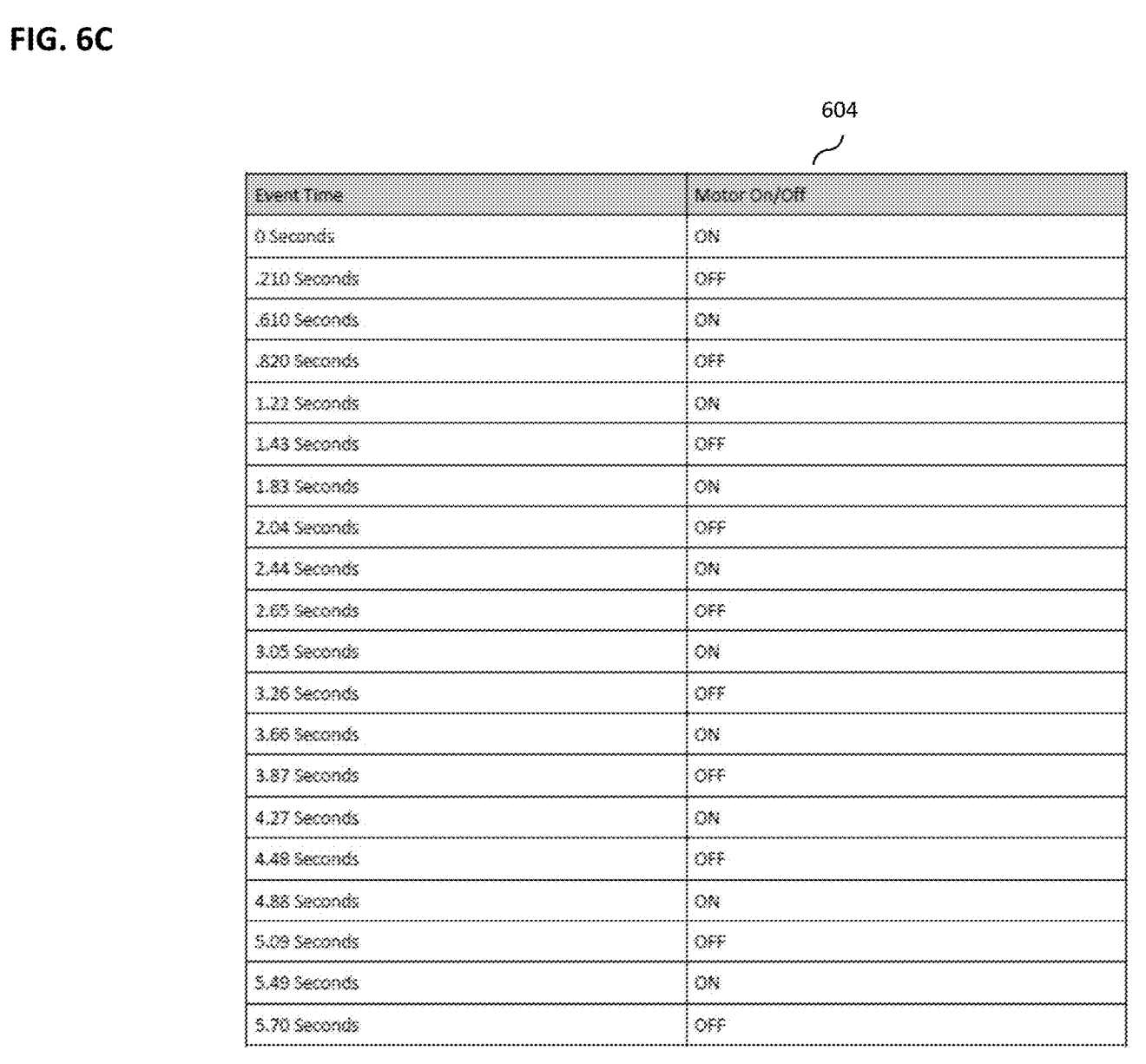

| Event Time | Motor On/Off |
|---|---|
| 0 Seconds | ON |
| .210 Seconds | OFF |
| .610 Seconds | ON |
| .820 Seconds | OFF |
| 1.22 Seconds | ON |
| 1.43 Seconds | OFF |
| 1.83 Seconds | ON |
| 2.04 Seconds | OFF |
| 2.44 Seconds | ON |
| 2.65 Seconds | OFF |
| 3.05 Seconds | ON |
| 3.26 Seconds | OFF |
| 3.66 Seconds | ON |
| 3.87 Seconds | OFF |
| 4.27 Seconds | ON |
| 4.48 Seconds | OFF |
| 4.88 Seconds | ON |
| 5.09 Seconds | OFF |
| 5.49 Seconds | ON |
| 5.70 Seconds | OFF |

702 — INFO BLOCK

| Address | INFO BLOCK |
|---|---|
| | EMPTY |
| | Current Count |
| | Lifetime Hours |
| | Last Run Time Time |
| | Last Connection Time |
| | Accelerometer Errors |
| | EEPROM Errors |
| | Total Power on Resets |
| | Last Run Start Battery Voltage |
| | Total Seconds On |
| | Number of Battery Changes |
| | Current Firmware Revision |
| | Number of SKUs |
| | Total Bluetooth Pairs |
| | Total Runs Transmitted |
| | 901p Comm Failures |
| | Total Number of Seconds Connected via Bluetooth |
| | RESET PIN RESET COUNT |
| | WATCHDOG RESET COUNT |
| | SOFT RESET COUNT |
| | CPU lock-up Count |
| | System Off Wakeup from MPU |
| | Low Battery EXIT Count |
| | Good Run Stored Count |
| | SPARE |
| | Magic Numbers |
| | CRC of Info Block |

704 — Data Block

| Address | Data Block |
|---|---|
| | Run Number |
| | Date and Time on run |
| | Total SKU Cnt |
| | Battery Start |
| | Temp |
| | Total Power on Resets |
| | Min Run Voltage |
| | O1 Amp |
| | O1 Amp |
| | O2 Amp |
| | O2 Amp |
| | O3 Amp |
| | O3 Amp |
| | O1 angle 180 - 93 |
| | O1 angle 180 - 0 |
| | O1 angle 90 - 91 |
| | O1 angle 90 - 0 |
| | O1 angle 0 - 90 |
| | O1 angle 0 - 0 |
| | O2 angle 180 - 91 |
| | O2 angle 180 - 0 |
| | O2 angle 90 - 180 |
| | O2 angle 90 - 0 |
| | O2 angle 0 - 90 |
| | O2 angle 0 - 0 |
| | CRC |
| | FREE SPACE |

TOOTHBRUSH SYSTEM

CROSS-REFERENCE TO RELATED APPLICATIONS

The present application is a continuation of International Patent Application No. PCT/US2020/070693, filed Oct. 26, 2020, which claims priority to U.S. Provisional Patent Application No. 62/926,212, filed Oct. 25, 2019, and to U.S. Provisional Pat. Appl. No. 63/062,979, filed Aug. 7, 2020, with the entirety of each of these applications incorporated herein by reference.

The present application also relates to U.S. patent application Ser. No. 16/263,802, filed Jan. 31, 2019 to May et al, entitled "A Toothbrush System", which claims priority to U.S. Provisional Patent Application No. 62/624,433 to May et al., filed Jan. 31, 2018, and entitled "A Toothbrush System With Improved Tracking, Feedback, Data Storing, Communication And Evaluation Features And Methods Therefor", with the entirety of each of these applications incorporated herein by reference.

TECHNICAL FIELD

The present disclosure generally relates to dental instruments and, in particular, to toothbrush systems and/or interchangeable motor devices for toothbrushes having improved tracking, feedback, data storing, communication and/or evaluation capabilities.

BACKGROUND

Brushing of teeth is essential to maintaining good oral health. Various manual and electric toothbrushes exist that allow consumers to select a toothbrush that is geared towards their specific desires and needs. A toothbrush is used to clean teeth, gums, and tongue. It typically includes a brush head having a plurality of bristles, on which toothpaste is applied, and a handle that allows the user to clean hard-to-reach areas of the mouth. Toothbrushes are available with different bristle textures, sizes, forms, etc. Soft bristle toothbrushes can minimize damage to tooth enamel and provide less irritation to the gums. While manual toothbrushes are able to provide adequate cleaning of the teeth, it has been discovered that electric toothbrushes while not only providing superior cleaning, also reduce incidence of various dental diseases, such as gingivitis, plaque, etc. These brushes are typically more costly because of the integrated electronics. Further, various components of electric toothbrushes occasionally breakdown, requiring replacement of the entire toothbrush. Moreover, conventional toothbrushes are unable to provide useful feedback to the user on the user's brushing habits.

SUMMARY

In some implementations, the current subject matter relates to a toothbrush apparatus that may provide improved tracking, feedback, data storing, communication, and/or evaluation capabilities. The apparatus may include one or more sensing module(s) (e.g., accelerometer(s), sensor(s), detector(s), and/or any other sensing/detecting device(s)) that perform at least one of the following: sensing/detection of at least one time period associated with use of the toothbrush apparatus, sensing/detection of one or more movements of the toothbrush apparatus, sensing/detection of position of the toothbrush apparatus (whether inside a user's mouth, outside of the user's mouth, etc.), sensing/detection of brushing intensities, operational status (e.g., on/off, data transmission/receipt, troubleshooting, updating, execution of one or more functions, etc.) of the toothbrush apparatus, and/or any other information and/or any combination thereof.

In some exemplary implementations, the apparatus may be configured to include one or more modules that may detect and/or measure and/or determine a number of strokes in one or more axis (e.g., longitudinal axis and/or any other axis) of the toothbrush. This determination/measurement may be performed by determining/measuring acceleration along one or more axis (e.g., longitudinal axis, etc.) of the toothbrush and processing the data associated with the determined acceleration. The processing may include filtering of the data (e.g., using a low-pass filter) to generate a waveform and determining a slope of the waveform. If the determined slope (whether positive and/or negative slope) exceeds a predetermined threshold for a predetermined period of time, the apparatus may be configured to count movement associated with the determined slope as a brushstroke. In some exemplary implementations, the apparatus may be further configured to count a number of brushstrokes during a predetermined period of time (e.g., every 30 seconds) and store the count in memory.

In some implementations, the apparatus may be further configured to determine/measure an average amplitude of longitudinal acceleration (e.g., x-axis acceleration, y-axis acceleration, etc.) for a predetermined period of time (e.g., for every 30 seconds). Moreover, based on the above data, the apparatus may be configured to determine brushing intensity that is being applied (e.g., how vigorous the user is brushing) as well as how long each brushstroke is. Shorter and less vigorous strokes may be indicative of normal brushing intensity that may avoid damaging user's teeth/gums/oral cavity.

In some implementations, the apparatus's one or more processors communicatively coupled to the sensing module may determine one or more measurements based on at least one of: the detected time periods, the detected movements, the determined positions of the toothbrush, the determined number and/or length of brushstrokes, the determined brushing intensities, and any combination thereof, and store the determined measurements in one or more memory locations communicatively coupled to the processors. The apparatus may also include one or more communication modules (e.g., Bluetooth™, Bluetooth™ Low Energy, Bluetooth™ Classic, Bluetooth™ Smart, WiFi, 3G, 4G, 5G, LTE, NFC (near field communications), etc.) that receive/transmit data related to the stored measurements.

In some implementations, the current subject matter may include one or more of the following optional features. The toothbrush apparatus may also include a brush head, and a housing including an interchangeable motor module, and the feedback modules. The interchangeable motor module may include one or more power modules, one or more memories, and the processors. In some exemplary implementations, the interchangeable motor module can be backwards compatible, e.g., it can be used in any toothbrush apparatus (whether smart/connected and/or non-smart/connected toothbrush apparatus) that can accommodate placement and/or connection (e.g., mechanical, electrical, and/or electromechanical, etc.) of the motor module with the toothbrush apparatus.

In some implementations, the time periods may include at least one of the following: a start time for using the toothbrush apparatus, an end time for using the toothbrush apparatus, a length of time during which the toothbrush apparatus is being used, a number of times the toothbrush apparatus is used, a duration between at least two uses of the toothbrush apparatus, amplitude of the accelerometer, coordinates of the accelerometer, and any combination thereof. In some implementations, the sensing module may include at least one of the following: an accelerometer, a clock, a monitoring module, and any combination thereof. Further, the measurements may be separately determined for each user in a plurality of users of the toothbrush apparatus. Additionally, the measurements may include at least one of the following: a brushing intensity, a brushing pressure and/or any other pressure, one or more parameters associated with brushing or other movements, a location of the toothbrush apparatus in a mouth of a user during brushing or outside of the user's mouth, orientation of the toothbrush apparatus (inside or outside of the user's mouth), a coverage of brushing, battery voltage measurement, motor current, motor speed, toothbrush temperature, biometric readings of the mouth, and/or any combination thereof.

In some implementations, the communication modules may be configured to transmit to one or more than one or more external devices communicatively coupled to the toothbrush apparatus.

In some implementations, the transmitted/received signals may include at least one of the following: an audio signal, a visual signal, an optical signal, an ultrasound signal, a vibration, a radio frequency signals (RF), an ultra-wideband signal, various communications signals (e.g., Bluetooth™, Bluetooth™ Low Energy, Bluetooth™ Classic, Bluetooth™ Smart, WiFi, 3G, 4G, 5G, LTE, NFC, etc.) and/or any combination thereof. Further, the signals may correspond to a different time period during which the toothbrush apparatus is used. Also, the signals may correspond to one or more parameters (e.g., speed, intensity, location, positioning, orientation, power consumption, etc.) associated with operation of the toothbrush apparatus.

In some implementations, the data relating to measurements associated with the toothbrush system may be recorded, stored, and/or transmitted/received automatically, at predetermined period of time, and/or after each use of the toothbrush apparatus. Further, the signals may be generated based on a mode of operation of the toothbrush apparatus. The mode of operation may include at least one of the following: a low mode, a high mode, a soft mode, a whitening mode, a gentle mode, a firm mode, a communications mode, an advertising mode, a sleep mode, and any combination thereof. In some implementations, the data may be stored and/or processed by the toothbrush system (e.g., by the toothbrush system's processor, memory, various interfaces, and/or any other computing components). In further implementations, the toothbrush system may be configured to transmit the data to one or more external computing devices (e.g., a smartphone, a tablet computer, a personal computer, a personal digital assistant (PDA), a database, a server, etc.) for processing and/or storage. The external computing device(s) may include various hardware and/or software (e.g., a smartphone application, a browser, etc.) that may be configured to communicate with the toothbrush system, receive and/or transmit various data from the toothbrush system, generate one or more user interfaces based on the processed data, provide software update(s) to the toothbrush system, and/or perform any other functions, etc. Further, in some implementations, the data may be transmitted to a cloud storage system, a server system, and/or any other computing system.

In some implementations, the current subject matter relates to a method for tracking, recording, and generating feedback of use of a toothbrush apparatus. The method may include detecting at least one time period associated with use of the toothbrush, one or more movements of the toothbrush, and any combination. One or more measurements may be determined based on at least one of: the detected time periods, the detected movements, a brushing intensity, a brushing pressure and/or any other pressure, one or more parameters associated with brushing or other movements, a location of the toothbrush apparatus in a mouth of a user during brushing or outside of the user's mouth, orientation of the toothbrush apparatus (inside or outside of the user's mouth), a coverage of brushing, battery voltage measurement, motor current, motor speed, toothbrush temperature, biometric readings of the mouth, and any combination thereof. The measurements may be stored in a memory location. The data related to the measurements may be transmitted. In some implementations, the data above may be stored and/or processed by the toothbrush apparatus (e.g., by the toothbrush apparatus's processor, memory, various interfaces, and/or any other computing components). Alternatively, or in addition to, the toothbrush apparatus may be communicatively coupled (e.g., wirelessly, wired, etc.) to one or more external computing devices (e.g., a smartphone, a tablet computer, a personal computer, a personal digital assistant (PDA), a database, a server, etc.). The external computing device(s) may include various hardware and/or software (e.g., a smartphone application, a browser, etc.) that may be configured to communicate with the toothbrush apparatus, perform the above method, receive and/or transmit various data from the toothbrush apparatus, generate one or more user interfaces based on the processed data, provide software update(s) to the toothbrush apparatus, and/or perform any other functions, etc. Further, in some implementations, the data may be transmitted to a cloud storage system, a server system, and/or any other computing system. In some implementations, the current subject matter may include one or more of optional features discussed above.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6A illustrates an exemplary table that shows various on/off events for the toothbrush system shown in FIGS. 4A-B, according to some implementations of the current subject matter;

FIGS. 6B-C various operational characteristics of a motor module of the toothbrush system, according to some implementations of the current subject matter;

FIG. 7 illustrates an exemplary data (e.g., "brushing data") that may be collected, transmitted and/or stored by the toothbrush system and/or any external components, according to some implementations of the current subject matter;

DETAILED DESCRIPTION

Figure 1:
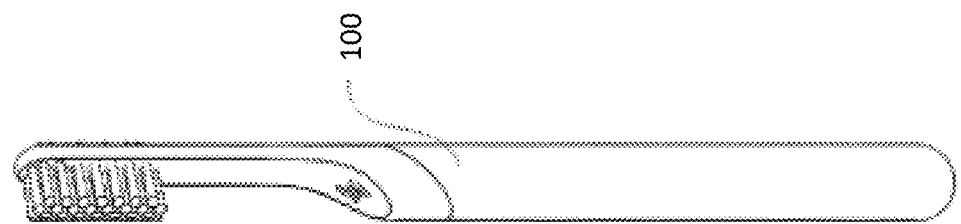
FIG. 1 illustrates an exemplary toothbrush system, according to some implementations of the current subject matter.

In some implementations, the current subject matter relates to a dental cleaning system and interchangeable motor device having improved tracking, feedback, data storing, communication and evaluation features is provided. The dental cleaning system may be a toothbrush system. The toothbrush system provides improved tracking of user brushing behavior and system operating performance. The tracked information/data may be stored in a local memory within the interchangeable motor device which provides secure, long term storage of the data. The toothbrush system may further include one or more feedback devices which may provide feedback to the user concerning the user's brushing behavior and/or the system performance. In some implementations, the data may be stored and/or processed by the toothbrush system (e.g., by the toothbrush system's processor, memory, various interfaces, and/or any other computing components). Alternatively, or in addition to, the toothbrush system may be configured to transmit the data to one or more external computing devices (e.g., a smartphone, a tablet computer, a personal computer, a personal digital assistant (PDA), a database, a server, etc.) for processing and/or storage. The external computing device(s) may include various hardware and/or software (e.g., a smartphone application, a browser, etc.) that may be configured to communicate with the toothbrush system, receive and/or transmit various data from the toothbrush system, generate one or more user interfaces based on the processed data, provide software update(s) to the toothbrush system, and/or perform any other functions, etc. Further, in some implementations, the data may be transmitted to a cloud storage system, a server system, and/or any other computing system.

The data stored in the system may be transferred to an external computing device by transmission of raw/unprocessed data (e.g., data as collected by various sensors, accelerometer, communication devices, pressure sensors, etc.), generating encoded/un-encoded feedback to/from the feedback devices. The feedback may be received by the external computing device and may be decoded into the user and/or system data. The data may then be transferred to an evaluation device for further review and/or analysis of the data in order to provide further services and/or notifications to the user and/or third parties. The system may further include power conserving features, such as a low power sleep state, to maximize power efficiency.

In some implementations, the current subject matter relates to a dental appliance (e.g., a toothbrush system, a toothbrush, etc.) that may include an accelerometer that may be configured to detect one or more movements of the dental appliance (e.g., the toothbrush being turned on/off, brushing with the toothbrush being initiated/completed, the toothbrush is operating in a particular quadrant of the mouth, the toothbrush is in a particular orientation inside/outside of user's mouth, the toothbrush is at a particular location/position inside/outside of user's mouth, a particular pressure being applied to the teeth (e.g., a sensor may sense a force, a feedback, etc. being applied to the teeth using bristles of the brush head), the toothbrush is being oriented in a particular direction, the toothbrush is being moved in a specific movement pattern (e.g., straight, circular, etc.), etc.).

The toothbrush system may include one or more of the following: an accelerometer, a gyroscope, a magnetometer, a pressure sensor, and/or any other sensor. The toothbrush system may further include one or more processors that may be communicatively coupled to the accelerometer and may be configured to determine one or more measurements based on the detected movements of the dental appliance and store the determined measurements in one or more memory locations communicatively coupled to the processor(s).

The toothbrush system may also include one or more feedback devices or modules (whether internal and/or external to the toothbrush) that may be configured to receive stored measurements and may encode the measurements into corresponding feedback signals. The toothbrush system's one or more transfer devices may be configured to transmit the feedback signals to one or more external devices that may be configured to be communicatively coupled to the dental appliance.

In some implementations, the current subject matter's toothbrush system may include one or more communications modules, e.g., Bluetooth™, Bluetooth™ Low Energy (BLE), Bluetooth™ Classic, Bluetooth™ Smart, WiFi, 3G, 4G, 5G, LTE, NFC (near field communications), etc. communication modules and/or any other communication modules and/or any combinations thereof. The communication modules may be configured to one or more communications capabilities to the toothbrush system, such as, for communicating with one or more computing devices (e.g., a smartphone, a tablet computer, a personal computer, a computing network, etc.). The communication modules may be configured to transmit/receive various signals. The transmitted/received signals may include at least one of the following: an audio signal, a visual signal, an optical signal, an ultra-sound signal, a vibration, a radio frequency signals (RF), an ultra-wideband signal, various communications signals (e.g., Bluetooth™, Bluetooth™ Low Energy, Bluetooth™ Classic, Bluetooth™ Smart, WiFi, 3G, 4G, 5G, LTE, NFC, etc.) and/or any combination thereof. Further, the signals may correspond to a different time period during which the toothbrush system is used. Also, the signals may correspond to one or more brushing parameters (e.g., speed, intensity, location, positioning, orientation, power consumption, etc.) associated with operation of the toothbrush system.

In some implementations, the current subject matter's toothbrush system may also be configured to include a sensing module, such as, for example, an accelerometer. The accelerometer may be configured to collect orientation data, including, but not limited to, (x, y, z) coordinates of the toothbrush while the toothbrush is turned (e.g., while the toothbrush's motor is operating). In some implementations, the current subject matter toothbrush system may be configured to include one or more sensors that may indicate that the toothbrush is inside the mouth. Alternatively, or in addition to, the use of the toothbrush may be configured to manually indicate that the toothbrush is inside user's mouth and its position may now be tracked. The coordinate data collected by the accelerometer may be configured to be transmitted to a communication device (e.g., a smartphone, a personal computer, a laptop, a tablet computer, etc.) that may be communicatively coupled to the toothbrush. This connection may be wired, wireless, and/or both. The communication device, using the received data, may be configured to determine positioning of the toothbrush within the mouth of the user. The positioning may include a position within a specific quadrant of the mouth of the user as well as indication whether the toothbrush's bristles are positioned with respect to the teeth of the user. In some implementations, the computing device may be configured to determine and indicate to the user of the toothbrush system that the user may be in a particular quadrant.

In some implementations, the toothbrush system may be configured to determine brushing intensity that the user is brushing with. As stated above, the toothbrush system may be configured to include an accelerometer, whose data may be used to measure and/or determine an amplitude of one or more axis of the accelerometer that is parallel to the toothbrush. Higher amplitude may correspond to more intense brushing (or over-brushing) and lower amplitude may correspond to less intense brushing. In some implementations, a threshold amplitude may be used to determine whether the user is brushing with greater intensity or with lesser intensity.

In some implementations, the current subject matter's toothbrush system may be configured to save data related to brushing ("brushing data"). The data may be saved by the toothbrush system (e.g., into a memory component incorporated into the toothbrush), by an external computing device, and/or any other device, and/or any combination thereof. The brushing data may be saved after every toothbrushing event (e.g., full brushing, partial brushing, and/or any on/off event). Alternatively, or in addition to, the brushing data may be saved after more than one toothbrushing event. In some exemplary, non-limiting implementations, the saved data may include any number of bytes (e.g., 64 bytes, 16 bytes, etc.) of information. The saved data may include at least one of the following: date and time, run number, total number of seconds the toothbrush was on, an operating temperature, a minimum battery voltage recorded, an average amplitude of the accelerometer's axis parallel with the toothbrush body, an average value of the accelerometer's axis parallel with the toothbrush body, one or more histograms of the time, a roll angle was calculated in each quadrant, and/or any other data, and/or any combination thereof. The data may be transmitted to and/or requested/queried/accessed by the external computing device.

In some implementations, the toothbrush system may be configured to save one or more of the following data (e.g., in different address blocks of the memory): current count (e.g., number of runs), lifetime counts, last run time, last connection time, accelerometer errors, EEPROM errors, total power on resets, last run start battery voltage, total seconds on, number of battery changes, current firmware revision, number of DFUs, total BLUETOOTH pairings, total runs transmitted, communication failures, total number of seconds connected via BLUETOOTH, resetpin reset count (e.g., number of times a reset pin was used to reset the toothbrush), watchdog reset count, soft reset count, CPU lock-up count, system off wakeup from GPIO, low battery error count, over max time error count, CRC of info block, and/or any other data. Further, the toothbrush system may be configured to save coordinate data information in one or more address fields. For example, for each run, the toothbrush system may be configured to save one or more of the following: run number, date and time of run, time set flag, runtime seconds, temperature, total power on resets, minimum battery voltage, Q1 (quadrant 1) amplitude (Amp), Q2 Amp, Q3 Amp, Q4 Amp, Q1 x-avg (average x-axis position of the toothbrush in quadrant 1), Q2 x-avg, Q3 x-avg, Q4 x-avg, Q1 angle −180--91 (inclination angle of the toothbrush in quadrant 1), Q1 angle −90-0, Q1 angle 0-90, Q1 angle 90-180, Q2 angle −180--91, Q2 angle −90-0, Q2 angle 0-90, Q2 angle 90-180, Q3 angle −180--91, Q3 angle −90-0, Q3 angle 0-90, Q3 angle 90-180, Q4 angle −180--91, Q4 angle −90-0, Q4 angle 0-90, Q4 angle 90-180, CRC, and/or any other information. In some exemplary implementations, the quadrant may be defined using a predetermined time period. The predetermined time period may be pre-settable, pre-configured, and/or otherwise, pre-determined in any desired way for each quadrant and/or for one or more quadrants and/or for all quadrants. For example, a first quadrant may be associated with a brushing time period from 0 seconds to 30 seconds, second quadrant—with a brushing time period from 31 seconds to 60 seconds, third—from 61 seconds to 90 seconds, and fourth—from 91 seconds to 120 seconds. The time spent for brushing a quadrant can correspond to brushing all three sides of all or some of the teeth in that quadrant. In some exemplary implementations, the time allotted to each quadrant may be dependent on a number of teeth in that quadrant. Further, a user and/or a toothbrush apparatus and/or a computing device connectable to the toothbrush apparatus may be configured to define a specific time period for each of the quadrants.

Figure 2:
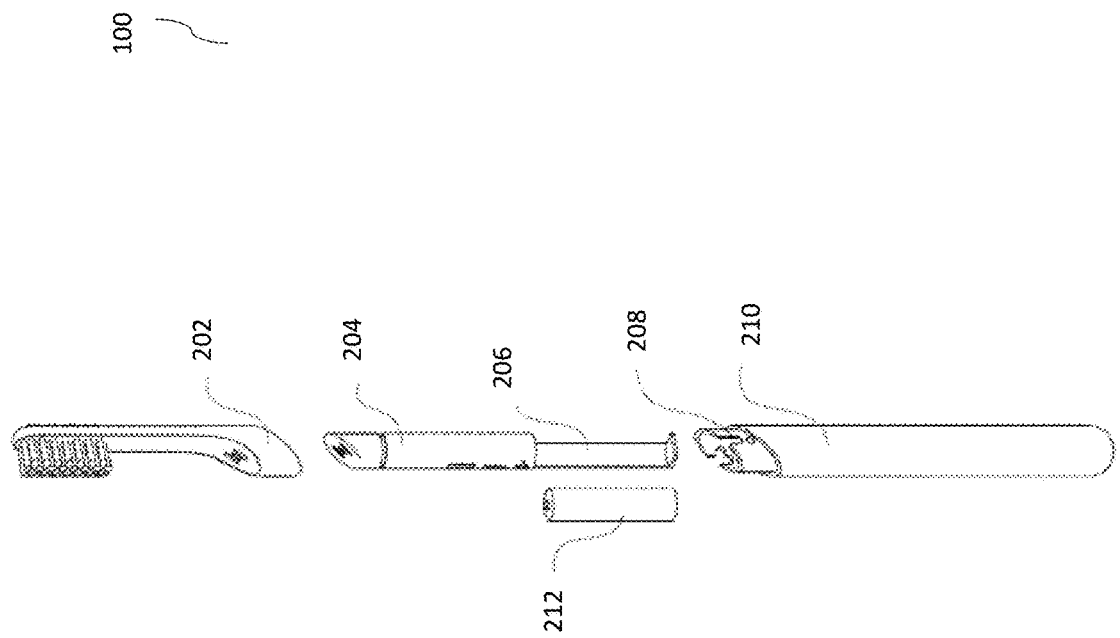
FIG. 2 illustrates an exploded view of the exemplary toothbrush system shown in FIG. 1, according to some implementations of the current subject matter.

FIG. 1 illustrates a perspective view of an exemplary toothbrush system 100, according to some implementations of the current subject matter. FIG. 2 illustrates an exploded view of the exemplary toothbrush system 100 shown in FIG. 1. The toothbrush system 100 may have a modular design which may enable easy and low cost replacement of parts and/or to maximize user customization options. By reducing cost and/or difficulty of both manufacture and installation, and/or by enabling users to customize their individual toothbrush with custom parts (e.g., bought and/or made themselves), users may choose parts that may be ergonomically comfortable, and/or aesthetically pleasing to each individual user, and/or enable low cost maintenance, replacement of parts, manufacturing, etc.

In some implementations, as shown in FIG. 2, the toothbrush system 100 may include a toothbrush head 202, a motor component 204, a battery compartment 206 within the motor assembly component 204 for accommodating placement of a battery 212, and a handle 210 having a locking mechanism 208. An exemplary toothbrush system is disclosed in the co-owned, co-pending U.S. patent application Ser. No. 14/522,805 to May, the disclosure of which is incorporated herein by reference in its entirety. The combined motor assembly 204 and the battery 212 may be placed inside the handle 210 and/or head 202, and the two remaining parts (e.g., handle 210, head 202) may securely connect to each other through the locking mechanism 208.

If the user wishes to purchase and/or install a separate custom version of the handle 210 with a unique shape, color, or design, the user may purchase and replace only that part (e.g., handle 210) on their toothbrush, which reduces the cost of customizing the toothbrush system 100 by changing the design of the toothbrush system 100 easily without the use of tools.

The separation of the toothbrush system 100 into four (or any other number of) smaller, modular parts that are easily disassembled may significantly reduce the cost of replacing the handle 210 and/or the head 202, and may increase the ease of replacing parts of the toothbrush in order to customize the design. In some implementations, the design of the toothbrush system 100 may also reduce manufacturing costs by minimizing the number of parts and/or assembly needed by the factory during production. The handle 210 may also be designed to have a simple geometry so that users inexperienced with three dimensional (3D) design software may be able to easily modify the external shape and/or appearance to suit their particular desire for function and/or aesthetics.

In some implementations, the motor assembly 204 and battery 212 may not be included, and/or may be optional parts of the toothbrush system 100. As the head 202 and handle 210 may be able to connect to each other securely using the locking mechanism 208, they may be able to act by themselves (e.g., without a motor and/or battery) as a fully capable, non-electric toothbrush. The inclusion of the motor assembly 204 and/or battery 212 may be optional, and may be added at a later time, or not at all, depending on the preferences of a particular user.

It is noted that a user may upgrade his/her toothbrush by purchasing and installing, without the use of tools, the motor assembly 204 and battery 212 separately to improve the functionality of their toothbrush system 100 to include the electric vibratory motor feature. In some exemplary implementations, the toothbrush can be upgraded with any desired components, including, but not limited to, any smart components, as described herein, without purchasing an entirely new toothbrush. Additionally, it is noted that if the motor assembly 204 is damaged and/or becomes dysfunctional, it may be possible to replace only that part, without requiring the use of tools, which reduces costs (e.g., the cost of maintenance for the user, the cost of warranty for the manufacturer, etc.), and enables simple repair and replacement by a user.

In some implementations, the toothbrush system 100 may also include an activation button (not shown in FIGS. 1-2) that may be pressed by the user to activate and/or deactivate the toothbrush, switch between modes of operation (e.g., regular brushing, whitening, sensitive teeth, a communications mode, etc.). The button may be electrically coupled to the motor assembly component 204. In alternate implementations, the toothbrush system 100 may be activated by moving the toothbrush system 100 from one location to another. Further, the toothbrush system 100, once activated, may remain in operational state for a predetermined period of time (e.g., 2 minutes). The operational state of the toothbrush system 100 may be maintained upon continuous/periodic detection of movement of the toothbrush system 100. If after initial movement of the toothbrush system 100, the toothbrush system 100 is not moved again, it may be deactivated automatically. In some implementations, in a communication mode, the toothbrush system 100 may be configured to transmit and/or receive data to/from one or more external devices. To initiate the communication mode, the activation button may be pressed and/or held by the user for a predetermined period of time (e.g., 5 seconds), subsequent to which the toothbrush system 100 may initiate transmission of signals/data to an external device (e.g., data relating to brushing (e.g., times, duration, pressure, intensity, frequency, etc.)) and/or receive signals/data (e.g., relating to an update of software of the toothbrush system 100, operational parameters, etc.). The communication mode may be terminated upon pressing the activation button again (e.g., either temporarily and/or for a predetermined period of time) and/or automatically, such as upon completion of data transmission/receipt. In some exemplary implementations, upon initiation of the communication mode, the toothbrush system 100 may perform a broadcast of signals/data in order to establish a communication channel with an appropriate external device and/or, upon performing appropriate authentication procedures, transmit/receive data to/from authenticated external device.

Figure 3:
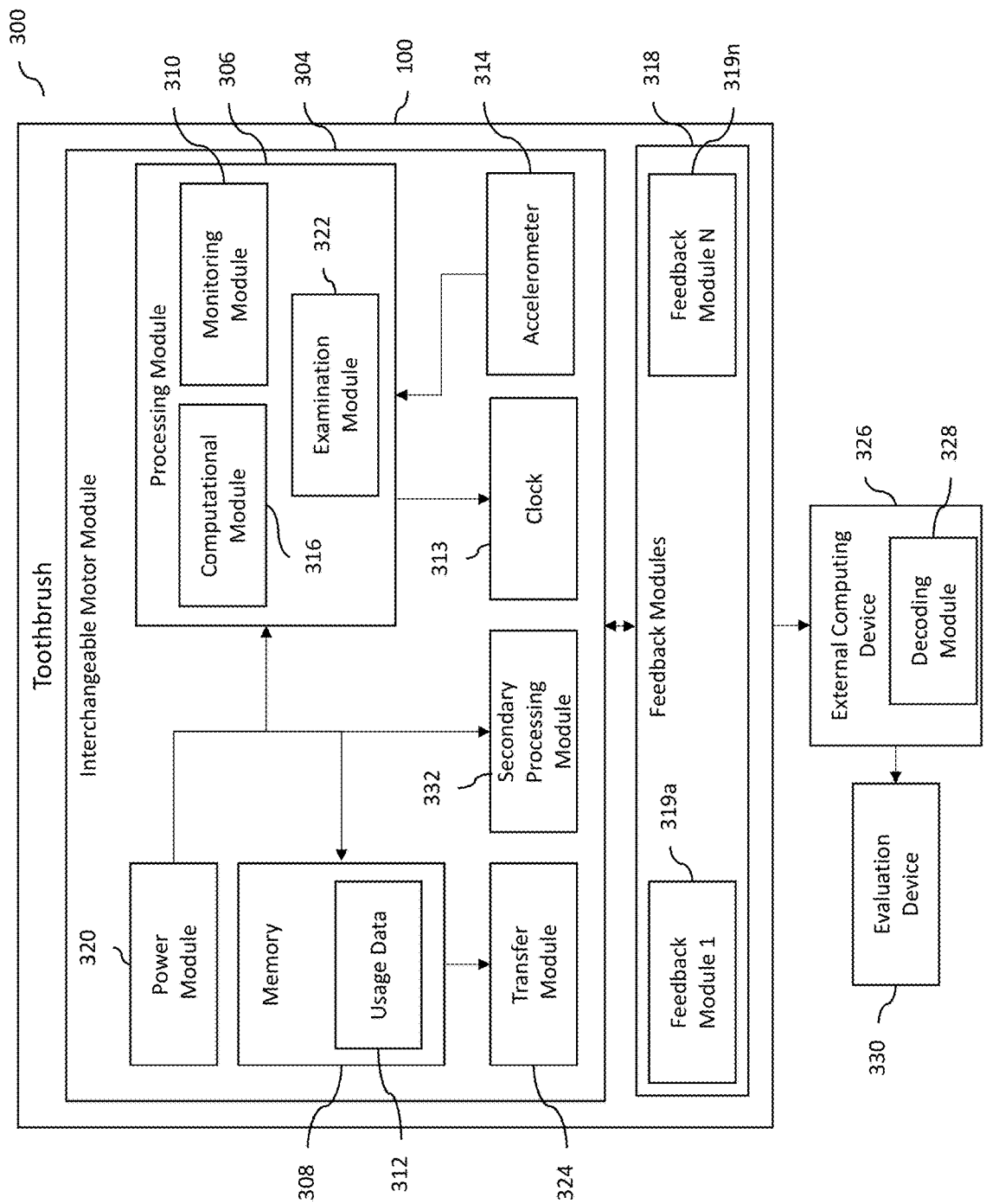
FIG. 3 is a block/flow diagram illustrating an exemplary toothbrush system, according to some implementations of the current subject matter.

FIG. 3 illustrates an exemplary toothbrush system 300, according to some implementations of the current subject matter. The system 300 may include a toothbrush system 100 that may be communicatively coupled to an external computing device 326 (including a decoding module 328), which, in turn, may be communicatively coupled to an evaluation device 330. The toothbrush system 100 may include an interchangeable motor module 304 that may be communicatively coupled to one or more feedback modules 318 (e.g., feedback modules 1, . . . N 319 (a, . . . , n)). The modules may be incorporated onto a flexible printed circuit board as various electro-mechanical components and may be communicatively coupled to one another using wired and/or wireless connections.

The motor module 304 may include a processing module 306, a memory 308, a clock 313, an accelerometer 314, a power module 320, a transfer module 324, and a secondary processing module 332. As can be understood, one or more of such modules may be included in the motor module 304. The processing module 306 may include a monitoring module 310, a computational module 316, and an examination module 322. The memory 308 may allocate a portion for storage of usage data 312. In some implementations, the motor module may include one or more sensing module(s), sensing element(s), and/or sensor(s) (hereinafter, "sensing module(s)"). The sensing module(s) may incorporate one or more of the modules above, including but not limited to, the accelerometer 314, timer and/or clock 313, monitoring module 310, computation module 316, examination module 322, secondary processing module 332, transfer module 324, and/or any other modules and/or any combination thereof. The sensing module(s) may be configured to perform detection and/or tracking of one or more movements of the toothbrush system 100 (e.g., location of the toothbrush system 100 in the user's mouth, motion of the toothbrush system 100 in the user's mouth, pressure applied by the toothbrush system 100 during brushing, etc.), times when toothbrush system 100 is being used (e.g., start time of teeth brushing, end time of teeth brushing, length of teeth brushing, time between teeth brushings, frequency of teeth brushings, etc.). In some implementations, the toothbrush system 300 may provide improved tracking, feedback, data storing, communication and evaluation features is provided.

In some implementations, the interchangeable motor module 304 may be received in an existing toothbrush and/or may be configured to provide motorized brushing functionality to the toothbrush as well as provide the improved tracking, feedback, data storing, communication and evaluation features. In some implementations, while the system 300 is generally described as including an interchangeable motor module, the motor module may be integrated into the toothbrush during the manufacturing process and/or may not be configured to be interchangeable by the user. As can be understood, one or more of the above modules may be integrated together and/or be separately disposed in the toothbrush system 100.

The interchangeable motor module 304 may include battery contacts to provide electrical conductivity with the power module 320, such as one or more batteries. The power module 320 may be configured to monitor the power from the power source and/or selectively enable power to be directed to one or more components of the system 300, including the components of the motor module 304 and/or feedback modules 319. The interchangeable motor module 304 may also include a switch for activating the motor device. Alternatively, the motor module 304 may be activated automatically upon detecting movement of the toothbrush 100.

In some implementations, the processing module 306 may be included on a circuit board that is secured to the interchangeable motor device. The circuit board may be a flexible printed circuit board assembly ("PCBA"). The flexible PCBA may provide various advantages in that it may permits the processing module 306 to maximize the available space within the cavity of the toothbrush. For example, the flexible PCBA may be configured in a folded switch back design. The flexible PCBA may be weaved in a snake-like fashion within the cavity of the toothbrush or placed into an S-formation to stack components efficiently. The flexible PCBA may also provide a solderless assembly for improved manufacturing efficiency and reliability. Moreover, the flexible PCBA may be configured to be more adaptable in improving location of a communication module antenna (e.g., Bluetooth™, etc.), In some implementations, the processing module 306 may be included on other circuit boards and/or devices. For example, the processing module 306 may be a combination of rigid and/or flexible printed circuit board assembly(ies) that may optimize cost, value, capability, efficiency and/or spatial parameters for the processing module 306.

The processing module 306's monitoring module 310 (and/or any sensing module(s)) may be configured to track usage data 312 concerning use of the toothbrush by one or more users. For example, the processing module 306 may be communicatively coupled to the clock 313 and/or other time measurement/tracking module/device. The monitoring module 310 may be configured to operate together with the clock 313 to determine when the toothbrush 100 is being used by the user(s). In some exemplary, non-limiting, implementations, the monitoring module 310 may be configured to receive time information from the clock 313 and record the time that the user begins brushing his/her teeth and stops brushing his/her teeth. In some implementations, in addition to recording starting and ending times of brushing, the clock 313 may also record a total time that the brushing and/or other use of the toothbrush has occurred.

In some implementations, the monitoring module 310 (and/or any sensing module(s)) may be configured to automatically determine that the toothbrush is being used when a button on the toothbrush that activates the switch on the interchangeable motor device is depressed. The monitoring module 310 may be configured to automatically determine that the brushing is finished when the button on the toothbrush is pressed again and the switch on the interchangeable motor device is turned off. In alternate implementations, the monitoring module 310 may be configured to determine when the toothbrush is used by other means, such as utilizing measurements from an accelerometer and/or other physical measurements concerning the toothbrush.

In some implementations, the accelerometer 314 (and/or any sensing module(s)) may be included on the processing device 106 and/or may be included on other portions of the interchangeable motor module 304 (as shown in FIG. 3) and/or toothbrush 100. The accelerometer 314 may be configured to collect measurements during usage of the toothbrush 100 by the user. The accelerometer 314 may be configured to obtain measurements concerning brushing intensity, brushing pressure, variety of brushing movements, location of the toothbrush during a brushing, coverage of brushing, etc. and/or any combination thereof. The system 300 may include additional monitoring devices (and/or any sensing module(s)), which may monitor physical features concerning the toothbrush system and/or user. For example, the toothbrush system 100 may be used by different users (e.g., upon exchanging of the head 202 shown in FIG. 2), whereby the toothbrush system 100 may be configured to detect that a different user is using the toothbrush by, for example, detecting exchange of the head 202 and prompting the user to confirm their identity. Once new user identity is confirmed, the system 100 may be configured to track usage data associated with different users.

The monitoring module 310 may further include a computational module 316 which may be configured to receive measurements concerning usage of the toothbrush by the user(s), including time measurements, accelerometer measurements, etc. and compute data concerning the usage. For example, the computational module 316 may be configured to determine the time length between the user's prior brushing and the present brushing, the time length of the user's present brushing, measurements concerning the user's brushing behavior, etc. In some implementations, the computational module 316 may be located in the toothbrush system, e.g., module 304, and/or any other module of the toothbrush system. The computational module 316 may be configured to process and/or store various data. Alternatively, or in addition to, the toothbrush apparatus may be communicatively coupled (e.g., wirelessly, wired, etc.) to one or more external computing devices (e.g., a smartphone, a tablet computer, a personal computer, a personal digital assistant (PDA), a database, a server, etc.) that may be configured to include the computational module 316. The external computing device(s) may include various hardware and/or software (e.g., a smartphone application, a browser, etc.) that may be configured to communicate with the toothbrush apparatus, receive and/or transmit various data from the toothbrush apparatus, generate one or more user interfaces based on the processed data, provide software update(s) to the toothbrush apparatus, and/or perform any other functions, etc. Further, in some implementations, the data may be transmitted to a cloud storage system, a server system, and/or any other computing system.

Regardless of the location of the computational module 315, the module 316 may also include predetermined values relating to desired measurements or measurement ranges for the data concerning usage of the toothbrush by the user and/or system operational data (collectively, the "usage data" 312). For example, the computational module 316 may include predetermined values representing a minimum and maximum length of time for a brushing, a minimum or maximum length of time between brushings, a desired pressure exerted by the bristles of the toothbrush on the user's teeth/gums, maximum and minimum levels of motion of the toothbrush, desired coverage within regions of the user's mouth, length of time of the toothbrush at particular regions, etc. The computational module 316 may be configured to compare the measured usage data to the predetermined values and determine if the usage data is in compliance with such values.

The feedback modules 319 may be integrated into the toothbrush system 100 and may include an audio device, a vibrational device, a visual feedback device, such as an LED light or display, a haptic device and/or any other feedback devices. The vibrational device may be a portion and/or aspect of the motor or a separate vibrating feedback device. The feedback modules 319 may be configured to generate feedback to the user concerning the usage data, system operational characteristics, etc. For example, if the usage data is in compliance and/or is not in compliance with a predetermined desired value, the computational module 316 may be configured to activate the feedback modules 319 to provide specific feedback to the user indicating such compliance and/or non-compliance. The feedback signals may include audio signals, such as a beep, changes in the vibration pattern, a light being activated, a display generating a readable message, etc. Similar to the computational module 316, the feedback modules 319 may be located in one or more external computing devices (e.g., a smartphone, a tablet computer, a personal computer, a personal digital assistant (PDA), a database, a server, etc.). Any data that may be processed, transmitted, and/or received by the feedback modules 319 and/or computational module 316 may be transmitted to/received from one or more cloud storage systems, server system(s), and/or any other computing system(s).

As an example, if the length of time between brushings exceeds a predetermined maximum length of time, an audio device 319 may generate an audio signal and/or a visual feedback device may generate visual feedback. Similar feedback may be generated if the computational module 316 determines that brushing pressure is too high or too low, an accelerometer 314 shows too much or too little motion, the length of the brushing time is too long or too short or any other brushing parameter concerning the brushing behavior is not in compliance or is in compliance, etc.

Additionally, the feedback modules 319 may be configured to generate feedback based on cumulative usage data. For example, a goal such as twenty consecutive brushings that are on time by the user may be indicated with the generation of a pleasing audio tone.

In some implementations, the feedback signals provided by the feedback modules 319 may be provided immediately after the user is done using the toothbrush. For example, the system 100 may be configured so that the audio device 319 generates an unpleasant or "angry" beep after the user brushes his/her teeth to signal that the user missed a brushing or the brushing was late. The system may generate a pleasant beep after the brushing to signal that the brushing was on time. In alternate implementations, the feedback signals provided by the feedback modules 319 may be provided when the user begins using the toothbrush.

In some implementations, the system 100 may be configured to generate feedback signals in regular time increments and/or at specific times. For example, the system 100 may include a child mode, which may be configured to remind children to brush their teeth at one or more specific times during the day or one or more time intervals during the day (e.g., 8 hours after the user's last brushing). In the child mode, the feedback modules 319 may be configured to generate reminders that attract the child's attention and motivate the child to use the toothbrush, such as a pleasing or entertaining audio signal.

The system may also be configured so that the feedback modules 319 provide feedback signals during regular time increments during the brushing by the user. In some exemplary, non-limiting implementations, the feedback modules 319 may be configured to provide feedback every 30 seconds to indicate to the user that the toothbrush should be moved to a different quadrant of the mouth. This feedback signal may be an audio signal, a vibrational signal, etc. Alternatively, or in addition to, the feedback may include turning on/off the motor of the toothbrush for a predetermined period of time and/or at predetermined periods of time (e.g., when it is time to switch from one quadrant to another, stop brushing, etc.). Additionally, the toothbrush system 100 may have various different brushing modes, such as a low mode, high mode, soft mode, whitening mode, gentle mode, firm mode, etc. The system may be configured to trigger the feedback modules 319 to provide feedback signals indicating that the user should change the current brush mode to another mode.

In some implementations, the system 100 may be configured so that the power module 320 automatically disables power to the interchangeable motor module 304 after the brush has been used for a specific length of time, e.g., two minutes.

The system 100 may also be configured so that the feedback modules 319 generate feedback signals based on system operational characteristics. For example, the computational module 316 may be configured to compare a current power level of the power source as determined by the power module 320 with a predetermined minimum power reserve level. The feedback modules 319 may be configured to generate feedback signals, such as an audio and/or visual warning and/or vibration if the power is below the predetermined minimum power level.

The system 100's examination module 322 may be configured to monitor the operational performance of the system. The examination module 322 may determine that one of the components of the system 100, such as the toothbrush head or motor has malfunctioned. In some implementations, the examination module 322 may be configured to trigger the feedback modules 319 to provide feedback signals upon detection of a malfunction.

The processing module 306 including the monitoring module 310 and computational module 316 may be configured to store the tracked usage data 312 in memory 308. The system 100 may also be configured so that other tracked data, such as operational performance data determined by the examination module 322 may be stored in the memory 308. The memory 308 may be any computer-usable and/or computer readable storage medium, such as electronic, magnetic, optical and electromagnetic storage mediums, and/or any combinations thereof.

The memory 308 may provide local storage of data pertaining to the user and/or the system 100. The data may be stored for a long period of time (and/or any other predetermined period of time) in the memory 308 in a secure manner By way of a non-limiting example, the data may be stored for 1-3 years (and/or any other period of time) in the memory 308. The data may also be stored in selective levels of resolution to reduce memory usage.

By way of a non-limiting example, the toothbrush system 100 may be configured to track movement of the toothbrush system 100 during brushing by the user for a first period of time, e.g., 2 minutes, non-movement during a second period of time (e.g., between brushings), e.g., 8 hours, and movement of the toothbrush during subsequent brushing by the user for a second period of time, e.g., 2 minutes. The tracked data may also include other data, such as date, time of day the above time periods occurred, intensity of brushing, pressure applied, quadrants used, power consumed, power source level, etc. Based on the tracked data, the toothbrush system 100 may be determine measurements associated with the above data and store them into the memory 308. The measurements may be provided to the feedback modules 319. The feedback modules 319 may generate audio tones corresponding to each measurement, e.g., tone 1 for the first period of time, tone 2 for the second period of time, tone 3 for the third period of time, tone 4 for associated intensities, etc. The tones may be encoded by the transfer module 324 and then transmitted to the external computing device 326. As can be understood, the feedback signals are not limited to tones, and may include visual signals, optical signals, etc. The transfer module 324 may include an encoder that may be configured to encode feedback signals in such a way that they may be decoded by the decoding module 328 of the external computing device. Once the signals are decoded by the decoding module 328, the computing device 326 may generate a report that may contain information about user's use of the toothbrush system 100. In some implementations, the computing device may perform various analysis (e.g., including deep learning, machine learning, etc.) to assess user's brushing habits and provide appropriate indications (e.g., analysis may be performed based on brushing habits of other users, etc.), such alerts, suggestions, etc. This information may then be provided to the evaluation device 330 for further analysis and/or use by the user and/or any third parties (e.g., dentists, medical professionals, insurance companies, manufacturers, retailers, etc.).

The transfer module 324 may also be configured so that the feedback modules 318 provide system operational data to the external computing device 326. For example, the feedback modules 318 may be configured to generate feedback that is encoded to indicate error codes, firmware revision, motor serial identifier (ID), metadata concerning the device and its components, etc. and/or any combinations thereof.

The transfer module 324 may be triggered to transfer data stored in the memory 308 to the external computing device 326 upon the pressing of a button (not shown in FIG. 3) on the toothbrush 100. For example, the specific length of time that the button is pressed may cause the toothbrush system 100 to perform a partial transfer (e.g., data acquired since the last transfer) and/or a complete transfer of all of the data stored in memory 308. For example, a long press of the button (e.g., which exceeds 3 seconds) may trigger a full transfer of data while a shorter press (e.g., between 1-2 seconds) may trigger a partial transfer. In alternate implementations, the transfer module 324 may be configured to automatically transfer data stored in the memory 308 to the external computing device 326 at regular time intervals or after a certain number of uses of the toothbrush system 100. In some implementations, any data transfer(s) may be initiated, processed, triggered, etc. by one or more external computing device (as discussed above) that may be communicatively coupled to the toothbrush system. Further, one or more cloud system(s), server system(s), and/or any other computing systems may be used for the purposes of transmitting, receiving, transferring, processing, storing, and/or performing any other functions associated with data acquired by the toothbrush system. Further, any such transmission, receiving, transfer, processing, storage, and/or any other functions may be executed upon receipt of appropriate authentication (e.g., user name and/or password, public keys, private keys, etc., and/or any other information and/or any combination thereof).

Data may be transferred between the toothbrush system and/or any external devices using at least one of the following: an audio signal, a visual signal, an optical signal, an ultrasound signal, a vibration, a radio frequency signals (RF), an ultra-wideband signal, various communications signals (e.g., Bluetooth™, Bluetooth™ Low Energy, Bluetooth™ Classic, Bluetooth™ Smart, WiFi, 3G, 4G, 5G, LTE, NFC, etc.) and/or any combination thereof. Any type of data and/or signals may be transferred, which may include one or more brushing parameters (e.g., speed, intensity, location, positioning, orientation, power consumption, etc.) associated with operation of the toothbrush apparatus.

In some implementations, the feedback modules 318 may be configured to generate feedback signals to remind the user to transfer data to the external computing device 326. For example, the computational module 316 may determine that the length of time between the last data transfer exceeds a maximum elapsed time value since the prior data transfer and trigger the feedback devices to generate specific feedback signals which remind the user to transfer the data.

As stated above, the external computing device 326 may be configured to transfer the data received from the toothbrush to the evaluation device 330. In some implementations, the evaluation device 130 is a device included on a communications network, such as an Internet server.

In some implementations, the external computing device 326 may be configured to automatically transfer the data received from the toothbrush to the evaluation device 330 upon receipt of the data. In alternate implementations, the external computing device 326 may be configured to transfer the data to the evaluation device 330 at a specific time, time interval and/or event.

The evaluation device 330 may be configured to store the data and enable analysis of the data. For example, the evaluation device 330 may be configured to permit a dental care provider to access the data. The dental care provider may review the data and advise the user concerning his/her compliance. The dental care provider may also use the data on the evaluation device to diagnosis dental or health issues and/or to develop treatment plans, corrective care suggestions, and/or additional recommendations for the user. The dental care provider may also suggest new or revised predetermined values for the usage data to be input into the computational module 316 based on the user's dental health and brushing performance In one embodiment, the data in the evaluation device 330 may be reviewed by a dental care provider or another reviewer and suggestions for a dental appointment may be sent to the user on the external computing device or through other means.

In some implementations, a parent may access the data on the evaluation device 330 to determine if their child's use of the toothbrush has been in compliance. For example, the parent may review the data on the evaluation device to determine if the child has skipped a brushing, brushed for an insufficient amount of time or has not brushed properly.

The data stored by the evaluation device 330 may also be configured to be accessed by the user to enable self-evaluation of the data. For example, the user may review the data for analysis of compliance and for learning pertinent data and variables that can help improve the user's brushing habits and oral health.

The data in the evaluation device 330 may also be reviewed by dental insurance companies to provide more accurate insurance quotes which reflect the user's actual brushing habits. For example, the data in the evaluation device 330 may be reviewed by a dental insurance company and a revised insurance rate may be generated and communicated to the user.

The evaluation device 330 may be provided as part of an ecosystem established by the company that manufactures, markets or sells the toothbrush to the user or is affiliated with the company. The user may have an account with the company so that the identity and personal information of the user is integrated into the data in the evaluation device.

The company may review the data and transmit the data to the insurance company, dental care provider or to another third party. The company may also review the data to analyze the product performance and develop improvements in the system components, such as the toothbrush or the interchangeable motor device. The data may also permit the company to more accurately market additional products and services to the users. Coupons or rewards may also be provided to the user based on the data to incentivize compliance.

In some implementations, the interchangeable motor module 304 may include a serialized identification number that is stored in the processing module 306, such as in the memory 308. This may ensure compatibility and/or authenticity of data being recorded and/or transferred.

The data received from the toothbrush system 100 may be encrypted to indicate that the data originated from the specific toothbrush having the serialized identification number. The serialized identification number preserves the integrity of the data and prevents the data from being manipulated. The measurements from the accelerometer 314 may also be utilized for confirming that the toothbrush has been used by the user and that the data is valid.

The serialized identification number may be paired to the account of the user that is established by the company that manufactures, markets or sells the toothbrush to the user or that is affiliated with the company. This permits the data received from the toothbrush to automatically be associated with the user account. Additionally, the serialized motor identification number may permit the user to automatically log-in to the user's account with the company. The data encrypted with the motor identification number may also function as authenticated credentials which permit the user to use the device to automatically log in to the office of a dental care provider, medical provider, etc.

The serialized identification number may be transferred by the company to another user account upon request. Additionally, new toothbrushes or interchangeable motor devices having different serialized identification numbers may be linked to the user account. This may permit the user to upgrade or replace new brushes/motors and have the devices linked to their account even while retaining the original device.

In some implementations, the interchangeable motor module 304 may include a secondary processing module 332 and/or crystal. The secondary processing module 332 may be configured to require reduced power demands as compared to the processing module 306. The secondary processing module 332 may be configured to perform limited functions when the toothbrush is not in use in order to maximize battery life. These functions may include timing functions, memory functions, communication functions, etc.

The toothbrush system 100 may be configured so that the toothbrush may operate in a sleep state wherein the processing module 306 is inactive and the secondary processing module 332 is active. This permits the system 100 to maximize battery life. For example, in one embodiment, the toothbrush may be sufficiently powered on a single AA, AAA, etc. battery for a period of 3-6 months or longer. The low power sleep state of the system also increases the lifespan of the system by providing reduced wear on the inactive components. Alternatively, the toothbrush system 100 may be powered by a re-chargeable battery, where the toothbrush system 100 may generate a feedback signal indicative of a need to recharge the battery.

While the current subject matter is described with respect to a toothbrush system, the interchangeable motor module 304 may be configured for other dental and/or medical devices to provide improved tracking, feedback, data storing, communication and evaluation features therefor.

In some implementations, the current subject matter also relates to methods for providing improved tracking of user data and system data for a toothbrush system as described above in connection with the toothbrush system. The current subject matter also relates to methods for providing feedback to a user of a toothbrush system as described above in connection with the toothbrush system. The current subject matter further relates to improved data storage for user data and system data for a toothbrush system as described above in connection with the toothbrush system.

The current subject matter also relates to transferring user data and system data of a toothbrush system using feedback devices as described above in connection with the toothbrush system. The current subject matter further relates to methods for evaluating user data and system data using an evaluation device (which may be integrated with an established ecosystem) described above in connection with the toothbrush system. The current subject matter also relates to methods for efficiently powering a toothbrush system as described above in connection with the toothbrush system.

Figure 4A:
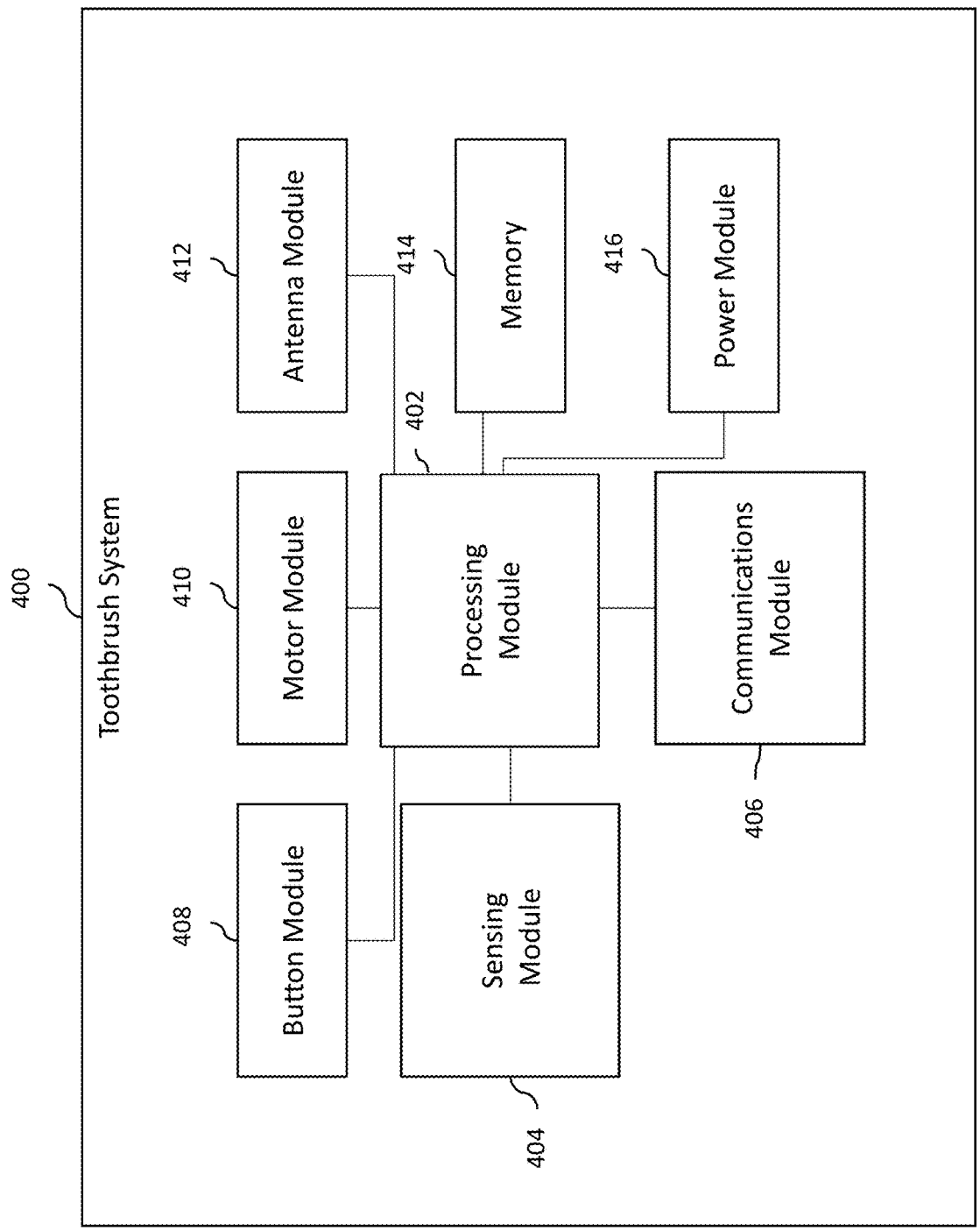
FIGS. 4A-B illustrates another exemplary implementation of the toothbrush system, according to some implementations of the current subject matter.
Figure 4B:
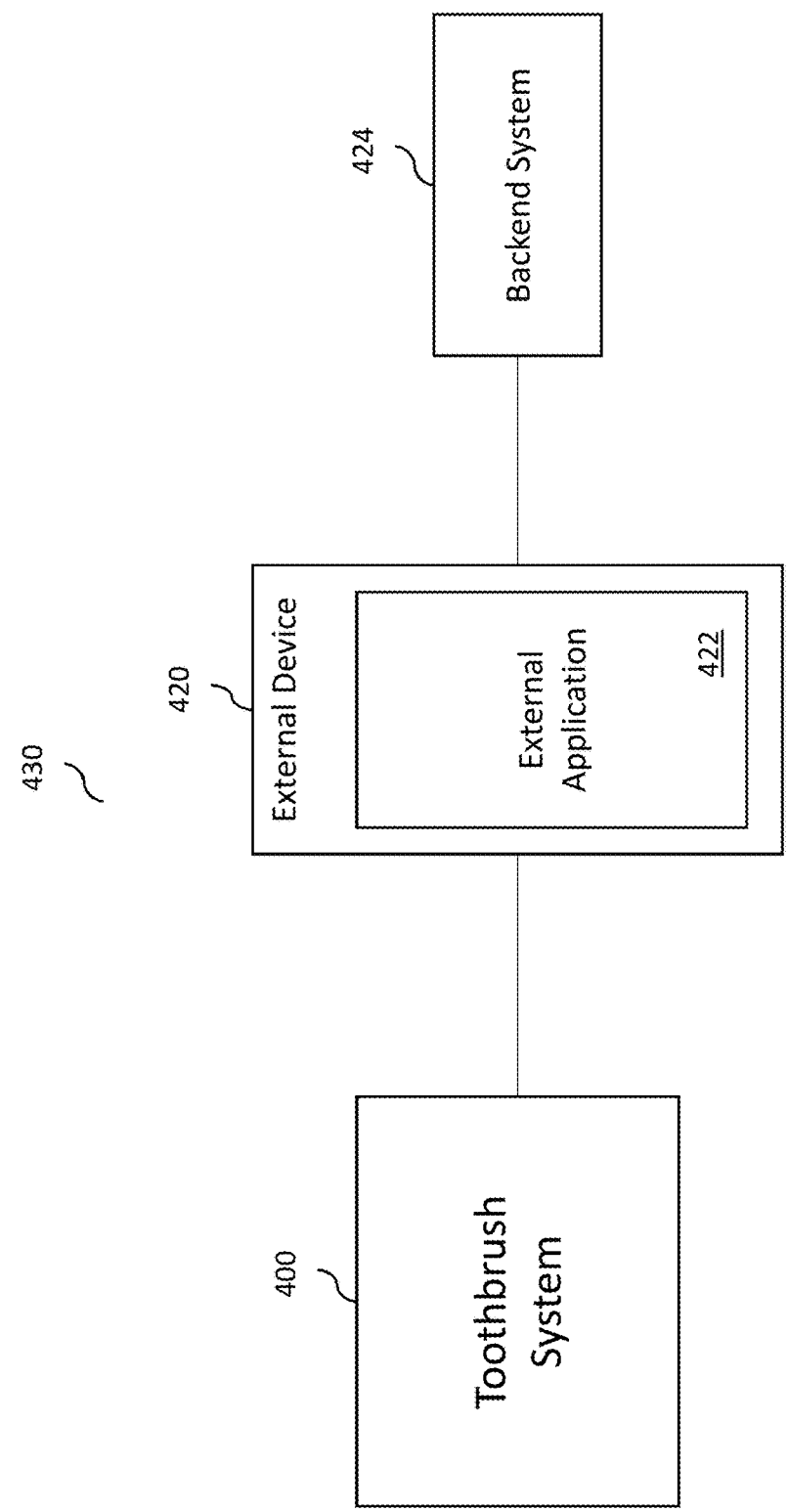

FIGS. 4A-B illustrate another exemplary implementation of the toothbrush system 400, according to some implementations of the current subject matter. The toothbrush system 400, as shown in FIG. 4A, may be configured to include one or more components of the toothbrush system 100 shown in FIG. 1 and/or FIG. 3. The toothbrush system 400 may include a processing module 402, a sensing module 404 (e.g., an accelerometer module, one or more pressure sensors, one or more location sensors, one or more orientation sensors, one or more counter devices, and/or any other sensors and/or devices, and/or any combination thereof), a communications module 406, a button module 408, a motor module 410, an antenna module 412, a memory module 414, and a power module 416. As can be understood, the toothbrush system 400 may include other modules. In some implementations, the toothbrush system 400 may also include a gyroscope, a magnetometer, a pressure sensor, a timing device, a battery sensor, a temperature sensor, and/or any other sensing device(s). Such devices may be incorporated into any component 402-416 of the toothbrush system 400.

In some implementations, as shown in FIG. 4B, the toothbrush system 400 may be implemented in a system 430. The system 430, in addition to the toothbrush system 400, may be configured to include one or more computing devices 420 having an application 422, one or more backend systems 424, and/or any other computing/communications components. The communication components may be configured to transmit/receive various signals. The system 400, computing device(s) 420, and/or system(s) 424 may be configured to be communicatively coupled using any communications media, whether wireless and/or wired (e.g., Bluetooth™ Classic, Bluetooth™ Smart, WiFi, 3G, 4G, 5G, LTE, NFC (near field communications), etc.). The components 400, 420, 424 of the system 430 may be configured to transmit/receive various signals that may include at least one of the following: an audio signal, a visual signal, an optical signal, an ultrasound signal, a vibration, a radio frequency signals (RF), an ultra-wideband signal, various communications signals (e.g., Bluetooth™, Bluetooth™ Low Energy, Bluetooth™ Classic, Bluetooth™ Smart, WiFi, 3G, 4G, 5G, LTE, NFC, etc.) and/or any combination thereof. The device(s) 420 may be configured to include one or more software applications 422 (e.g., "apps") that may be configured to receive various data (e.g., raw, unprocessed, processed, etc.), process received data, generate one or more user interfaces based on the processed data, provide software update(s) to the toothbrush system, and/or execute various other functions, etc. The software application 422 may be configured to communicate with the backend system 424 for further processing, storage, etc. of the data. The backend system 424 may include a cloud storage system, a server system, and/or any other computing system(s).

Figure 5C:
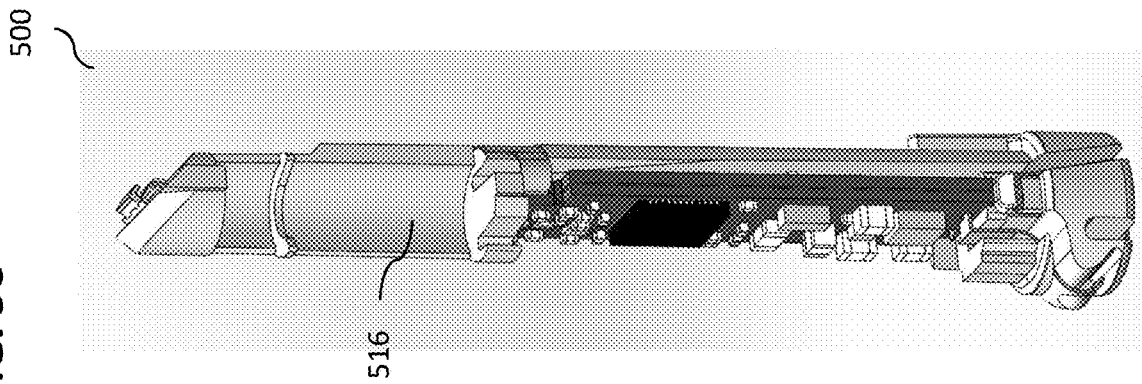
FIGS. 5A-C illustrate an operation core of a toothbrush system, such as toothbrush system shown in FIGS. 4A-B, according to some implementations of the current subject matter.
Figure 5B:
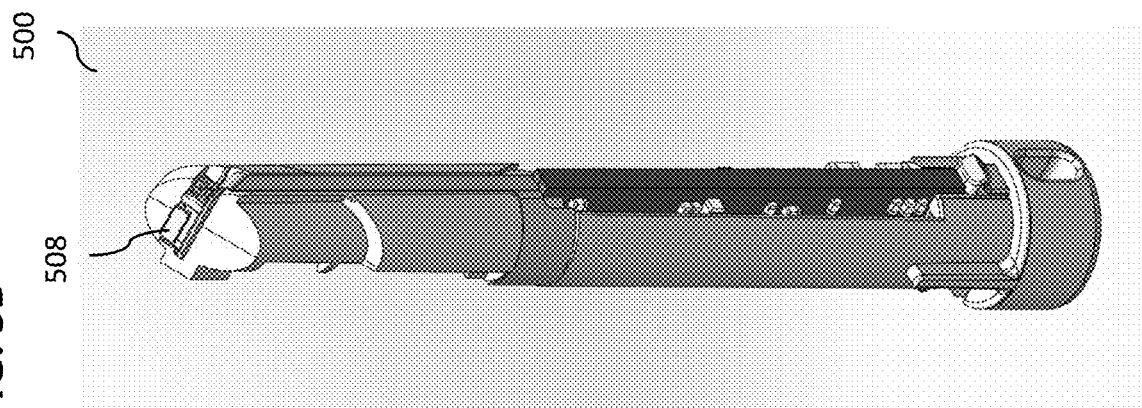
Figure 5A:
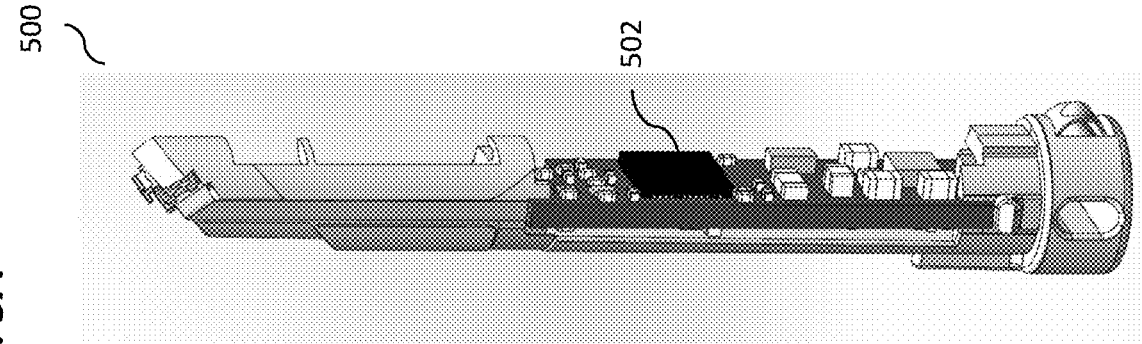

In some implementations, the processing module 402 may be similar to the processing module 306 shown in FIG. 3. The module 402 may be included on a circuit board (rigid and/or flexible, as for example shown in FIGS. 5A-C showing an operation core 500 of a toothbrush system, such as toothbrush system 400) and may be secured to the motor module 410 (which may be interchangeable, as described above). Similar to FIG. 3, the circuit board may be a flexible printed circuit board assembly ("PCBA"). The processing module 402 may also be contained on other circuit boards and/or devices.

The processing module 402 may be configured to track usage data concerning use of the toothbrush system 400 by its users, as described above with regard to FIG. 3. The processing module 402 may determine when the toothbrush system 400 has been turned on, turned off, in use, transmitting data, etc. The processing module 402 may be configured to incorporate a clock and/or other sensors that may record time, movement, type of action, etc. of various operational/non-operational events associated with the toothbrush system 400. The processing module 402 may be configured to record and store (in the memory module 414, for example) time information, action type information, key parameters, etc. that may be associated with every single brushing/non-brushing event/action (prior to event, during the event, and/or after completion of the event). Such events may include, but are not limited to, brushing of teeth, brushing of specific mouth quadrants, brushing of specific sides of teeth, brushing of specific teeth, brushing with specific intensity, brushing with specific pressure, brushing with specific speed, brushing time, brushing in a particular mode, brush head replacement, new/change of users registration/subsequent use, transmission of data to an external device, receipt of data from an external device, software update, activation, deactivation, change of battery, etc.

In some implementations, activation of the toothbrush system 400 may be configured to be detected by activating a button module 408 (e.g., user pressing a button). The user of the toothbrush system 400 may activate the button module 408 in various ways, e.g., by pressing button once, short-pressing button, long-pressing button (e.g., 2 seconds, 3 seconds, etc.), repeated pressing of the button, etc. Alternatively, the toothbrush system 400 may be configured to be activated using the sensing module 404, e.g., by detecting various movements of the toothbrush system 400 (e.g., picking up the toothbrush system; moving it side-to-side, up-and-down, diagonally, etc.; shaking it, etc.). By way of a non-limiting example, the module 404 may include an accelerometer for detection of movement of the toothbrush. As can be understood, other types of modules may be used. In further alternate implementations, the toothbrush system 400 may be configured to be activated using the communication module 406. For example, the module 406, which may include Bluetooth™, BLE, WiFi, NFC, cellular, and/or any other communication capabilities, may be configured to receive and/or transmit signals from an external device (e.g., a smartphone, a tablet computer, a laptop, a personal computer, a smart watch, etc.). Such signals may be configured to "wake-up" the toothbrush system 400 so that it may perform one or more actions, including turning on/off, brushing, data transmission, etc. As can be understood, the toothbrush system 400 may be activated in any other way.

In exemplary implementations, where the button module 408 may be configured to activate the toothbrush system 400, as stated above, a brushing event may be trigged by pressing a button. Once the button is pressed, the toothbrush system 400 may be configured to activate in a predetermined period of time (e.g., 100 ms or less). Brushing may be terminated by pressing the same or different button (alternatively, brushing may be terminated by the user not moving the toothbrush system 400 for another predetermined period of time). In some implementations, once the toothbrush system 400 is activated (e.g., during brushing), the motor module 410 may be running (e.g., vibrating, rotating, etc.) and/or may turn on/off at certain times to indicate certain events (and causing the processing module 402 to record and store events in memory 414). The events may be used to alert the user to switch from one side of teeth to another, switch one quadrant to another, and indicate to the user that a particular brushing cycle has been completed.

FIG. 6A illustrates an exemplary table 600 that shows various on/off events for the toothbrush system 400. For example, the motor of the toothbrush system 400 may be activated, corresponding to "On" indication, at 0 minutes 0 seconds. The motor may begin operation, whereby the toothbrush head (e.g., head 202 and/or its bristles) may begin vibratory, rotational, etc. movements. At 0 minutes 29.6 seconds, an "Off" event may be triggered, thereby temporarily stopping operation of the motor for, for example, 0.4 seconds. The motor may resume operation at 0 minutes 30 seconds. The off events may correspond to an indication to the user to change a quadrant/side of the teeth that the user is currently brushing. For example, if the user started brushing front side of the teeth in the upper left quadrant, the "Off" event at 0 minutes 29.6 seconds may be indicative that it is time to switch to the back side of the teeth in the upper left quadrant. The on/off and durations may continue (as shown in FIG. 6A) for a predetermined period of time (e.g., 2 minutes 1.475 seconds) and/or until the user has finished brushing all teeth and/or for any other reason. As can be understood, the on/off times and/or durations shown in table 600 are provided herein for exemplary, illustrative, and non-limiting purposes, and that other times/durations may be used.

In some implementations, the user may turn off the brushing system 400 by pressing the button of the button module 408 (e.g., once, for a short period of time, for a long period of time, repeatedly, etc.). Once pressed, toothbrush system 408 may be configured to turn off (e.g., the motor module 410 may stop operating) within a predetermined period of time (e.g., 100 ms or less). In some implementations, the toothbrush system 400 may be configured to enter into a "sleep mode" to conserve power. This may include turning off power supply from the power module 416 to one or more components of the toothbrush system 400 (e.g., sensing module 404, motor module 410, processing module 402, etc.). The sleep mode may be activated after a predetermined period of time, e.g., after 10 seconds of inactivity. The total average current consumption while the toothbrush system 400 is in sleep mode may be less than or equal to 50 µA. To exit the sleep mode, the toothbrush system 400 may be "woken up" by pressing a button of the button module 408, transmitting/receiving a signal using an antenna module 412 and the communications module 406 (e.g., Bluetooth™, BLE, WiFi, NFC, cellular, etc.). In some exemplary implementations, the toothbrush system 400 may continue transmitting/receiving signals using its communications module 406 while in sleep mode. In some implementations, an internal clock (e.g., incorporated into the processing module 402) may be set to a predetermined time to wake up the toothbrush system 400 and, hence, exit the sleep mode.

In some implementations, the toothbrush system 400 may be configured to include a real-time clock that may be configured to track real time while the toothbrush system 400 is active and/or asleep. The clock may be incorporated into the processing module 402 and/or any other module of the toothbrush system 400 and/or be a separate module. It may be configured to track time intervals (e.g., in seconds, minutes, hours, etc. in UNIX Epoch time and/or in any other time). The time intervals may be configured to be set using a Bluetooth™ command (or any other communications command). After each event (e.g., a brushing event, a transmission event, etc.), the toothbrush system 400 may store in the memory 414 an activation time of the event, data and/or parameters associated with the event, a total amount of time elapsed during the event, and/or any other data.

In some implementations, the toothbrush system 400's sensing module 404 may be configured to detect motion of the toothbrush system (e.g., pick-up of the toothbrush, brushing motion, positioning, angle of inclination, angle of approach, etc.). The sensing module 404 may be further configured detect acceleration changes, such as, for example, in an axis parallel with the toothbrush housing. The toothbrush system 400 may count a number of times the acceleration changes while the toothbrush is activated. At the end of the brushing event, the toothbrush system 400 may be configured to store such number of times during the brushing event. In some exemplary, non-limiting implementations, the sensing module 404 may include at least one of the following: an accelerometer module, one or more pressure sensors, one or more location sensors, one or more orientation sensors, one or more counter devices, and/or any other sensors and/or devices, and/or any combination thereof.

In some implementations, the sensing module 404 may be configured to collect orientation and/or direction of movement data, including, but not limited to, (x, y, z) coordinates of the toothbrush system 400 while the toothbrush is turned on (e.g., while the toothbrush's motor 410 is operating). The coordinate data collected by the module 404 may be transmitted to the external communication device 420 (e.g., a smartphone, a personal computer, a laptop, a tablet computer, etc.) that may be communicatively coupled to the toothbrush and may include application ("app") 422, as shown in FIG. 4B. The device 420, using the received data, may determine positioning of the toothbrush within the mouth of the user. The positioning may include a position within a specific quadrant of the mouth of the user and/or indication how the toothbrush's bristles are inclined (e.g., by determining an angle of inclination of the bristles and/or toothbrush) with respect to user's teeth. In some implementations, the device 420 may be configured to determine and/or indicate to the user of the toothbrush system 400 that the user may be in a particular quadrant and may suggest that the user should move to the next quadrant.

In some implementations, the toothbrush system 400 may determine brushing intensity that the user is brushing with. The data obtained by the module 404 may be used to measure and/or determine an amplitude of one or more axis of the module 404 that is parallel to the toothbrush. For example, higher amplitude may correspond to more intense brushing (or over-brushing) and lower amplitude may correspond to less intense brushing. In some implementations, a threshold amplitude may be used to determine whether the user is brushing with greater intensity and/or with lesser intensity.

In some implementations, the module 404's data may be streamed to the device 420 in real-time. This may allow "live" analysis of the accelerometer data to determine, for example, real-time location of the toothbrush in the user's mouth, real-time intensity of brushing, and/or any other information. The device 420 may be configured to include a user interface that may display user's brushing data, analysis, etc. along with any visual aids (e.g., a mock-up of user's mouth, etc.). The accelerometer data may be read at a predetermined frequency (e.g., 31.25 Hz) and may be transmitted using a Bluetooth™ connection. The data may be automatically transmitted. Alternatively, or in addition to, the data may be transmitted upon a prompt by the device 420, and/or at predetermined times.

In some implementations, the processing module 402 may be configured to perform battery voltage measurement. Such measurement may be performed periodically, upon request, automatically, etc. For example, while the toothbrush system 400 is in a brushing event (or any other event), the processing module 402 may be configured to read the battery voltage of the power module 416 and store and/or filter the results. At the end of the event, the toothbrush system 400 may be configured to store a minimum battery voltage during the event. In some implementations, the communications module 406 may be used to access the reading of the battery voltage, such as, using a Bluetooth™ command.

In some implementations, the toothbrush system 400 may include one or more sensors that may be incorporated in one or more locations in the toothbrush system 400. The sensors may be incorporated into one or more modules of the toothbrush system 400 and/or may one or more modules of the toothbrush system 400 may serve as such sensors. The sensors may be configured to measure temperature (e.g., operating temperature of the toothbrush system 400, user's mouth, ambient temperature, etc.), humidity, acidity, etc. For example, temperature may be measured using the sensing module 404. At the end of an event (e.g., brushing event), the toothbrush system 400 may store the temperature at the start of, during, and/or end of the event.

In some implementations, the toothbrush system 400's power module 416 may include a one-time use battery (e.g., AAA, AA, etc. battery), a rechargeable battery, and/or any other power source. It may also have a predetermined operational voltage. For example, the toothbrush system 400 may be configured to shut down when the battery voltage falls below a predetermined threshold voltage (e.g., 1.1 Volts (V), 1.05V, etc.) and/or falls below a predetermined threshold voltage for a predetermined period of time (e.g., 1.1V for 5 seconds). In this case, the toothbrush system 400 may be configured to require a reset, a change of battery, a recharge, etc. to continue to operate.

In some implementations, the processing module 402 of the toothbrush system 400 may be configured to determine that the battery 416 has low power and execute a low voltage battery shutdown procedure. A low voltage battery shutdown may be executed for one or more of the following events: if the battery voltage is under a predetermined voltage (e.g., 1.05V) for a predetermined period of time (e.g., 5 seconds) when the motor module 410 is not operating, if the total amount of time of the motor module 410 being "on" since the last power on reset is greater than a predetermined period of time (e.g., 28,800 seconds (120 seconds*2 times per day*120 days)). In some exemplary, non-limiting, implementations, once the low voltage battery shutdown occurs, a way to exit this error mode may be to perform a power on reset. When the toothbrush is in the error mode, the motor module 410 may be configured to generate a notification to the user that the error mode event occurred. One or more prompts may be generated to alert the user and/or to request performance of a particular action (e.g., turn off, replace battery, re-charge, etc.). Thus, when the button module 408 is activated in this module, the motor module 402 may be configured to operate using configuration 602 shown in FIG. 6B and turn off after it is complete.

As shown in FIG. 6B, the table 602 shows various motor on/off events for the toothbrush system 400. For example, the motor of the toothbrush system 400 may be activated, corresponding to "On" indication, at 0 seconds, at which the motor may begin operation. The "On" operation may be interrupted at 0.105 seconds by an "Off" event being triggered, thereby temporarily stopping operation of the motor for, for example, 0.2 seconds. The motor may resume operation at 0.305 seconds. The on/off and durations may continue (as shown in FIG. 6B) for a predetermined period of time (e.g., 2.24 seconds). The "On" intervals may last for the same and/or different amounts of time. The "Off" intervals may also last for the same and/or different amounts of time. The On/Off time intervals may be pre-configured. As can be understood, the on/off times and/or durations shown in table 602 are provided herein for exemplary, illustrative, and non-limiting purposes, and that other times/durations may be used.

In some implementations, the toothbrush system 400 may be configured to provide the user with information relating to operation of the toothbrush system 400 (e.g., using a function "show me motor operation" mode). To activate this mode, the button module 408 may be pressed by the user and the motor module 402 may be switched to operate using configuration 604 shown in FIG. 6C. This mode may be used for diagnostic purposes and/or monitoring operation of the toothbrush system 400.

As shown in FIG. 6C, the table 604 illustrates various motor on/off events for the toothbrush system 400, which, as stated above, may be used for diagnostic purposes. For example, the motor of the toothbrush system 400 may be activated, corresponding to "On" indication, at 0 seconds, at which the motor may begin operation. The "On" operation may be stopped at 0.210 seconds and an "Off" event being triggered to temporarily stop operation of the motor for, for example, 0.4 seconds. The motor may resume operation at 0.610 seconds. The on/off and durations may continue (as shown in FIG. 6C) for a predetermined period of time (e.g., 5.70 seconds). The "On" intervals may last for the same and/or different amounts of time. The "Off" intervals may also last for the same and/or different amounts of time. The On/Off time intervals may be pre-configured. As can be understood, the on/off times and/or durations shown in table 604 are provided herein for exemplary, illustrative, and non-limiting purposes, and that other times/durations may be used.

In some implementations, the memory 414 may be configured to store various parameters (including brushing parameters) relating to operation of the toothbrush system 400. This may include user brushing data and/or any other data. For example, at the end of every brushing event, the toothbrush system 400 may store in memory 414 various information using a memory map. The memory may store a current count (e.g., number of use times), lifetime counts, last run time, last connection time, accelerometer errors, EEPROM errors, total power on resets, last run start battery voltage, total seconds when the system 400 is on, number of battery changes, current software/firmware revision, number/total number of Bluetooth™ pairings, total runs transmitted, communication failures, number/total number of seconds connected using Bluetooth™, run voltage intervals (e.g., <0.8 v, 0.8 v-1 v, 1 v-1.2 v, 1.2 v-1.4 v, 1.4 v-1.6 v, >1.6 v, etc.), checksums of memory, etc. The memory 414 may also store a run number, date and/or time of the run, time set flag, runtime seconds, accelerometer data, temperature, total power on a reset, minimum battery voltage, and/or any other data. The above data may be transmitted using communication module 406 (e.g., using Bluetooth™, BLE, WiFi, etc.). Further, memory 414 may be cleared/erased, such as by transmitting a command to the communication module (e.g., using Bluetooth™, BLE, WiFi, etc.). Upon receiving such commands, the data values that may be stored in the memory 414 may be initialized to 0 and/or any other desired values (e.g., factory settings, etc.). The data stored in the memory 414 may be check-summed (e.g., using CRC, etc.) to ensure that it has not been corrupted. A user ID and a password may be setup to allow users to access data that may be stored by the memory 414.

FIG. 7 illustrates an exemplary data 702, 704 (e.g., "brushing data") that may be collected, transmitted and/or stored by the toothbrush system 400 and/or any external components 420, 424. As stated above, the brushing data may be saved by the toothbrush system 400, e.g., into the memory 414, by the external computing device 420, 424, and/or any other device, and/or any combination thereof. The brushing data may be saved after every toothbrushing event (e.g., full brushing, partial brushing, and/or any on/off event). Alternatively, or in addition to, the brushing data may be saved after more than one toothbrushing event. In some exemplary, non-limiting implementations, the saved data may include any number of bytes (e.g., 64 bytes, 16 bytes, etc.) of information. As shown in FIG. 7, saved data 702 may include at least one of the following: date and time, run number, total number of seconds the toothbrush was on, an operating temperature, a minimum battery voltage recorded, an average amplitude of the accelerometer's axis parallel with the toothbrush body, an average value of the accelerometer's axis parallel with the toothbrush body, one or more histograms of the time, a roll angle was calculated in each quadrant, and/or any other data, and/or any combination thereof. The data may be transmitted to and/or requested/queried/accessed by the external computing device.

As is further shown in FIG. 7, in some exemplary implementations, the toothbrush system 400 may be configured to save one or more of the following data 704 (e.g., in different address blocks of the memory): current count (e.g., number of runs), lifetime counts, last run time, last connection time, accelerometer errors, EEPROM errors, total power on resets, last run start battery voltage, total seconds on, number of battery changes, current firmware revision, number of device firm upgrades (DFUs), total Bluetooth™ pairings, total runs transmitted, communication failures, total number of seconds connected via Bluetooth™, resetpin reset count (e.g., number of times a reset pin was used to reset the toothbrush), watchdog reset count, soft reset count, CPU lock-up count, system off wakeup from GPIO, low battery error count, over max time error count, CRC of info block, and/or any other data.

Further, the toothbrush system may be configured to save coordinate data information in one or more address fields. For example, for each run, the toothbrush system may be configured to save one or more of the following: run number, date and time of run, time set flag, runtime seconds, temperature, total power on resets, minimum battery voltage, Q1 (quadrant 1) amplitude (Amp), Q2 Amp, Q3 Amp, Q4 Amp, Q1 x-avg (average x-axis position of the toothbrush in quadrant 1), Q2 x-avg, Q3 x-avg, Q4 x-avg, Q1 angle −180--91 (inclination angle of the toothbrush in quadrant 1), Q1 angle −90-0, Q1 angle 0-90, Q1 angle 90-180, Q2 angle −180--91, Q2 angle −90-0, Q2 angle 0-90, Q2 angle 90-180, Q3 angle −180--91, Q3 angle −90-0, Q3 angle 0-90, Q3 angle 90-180, Q4 angle −180--91, Q4 angle −90-0, Q4 angle 0-90, Q4 angle 90-180, CRC, and/or any other information. In some exemplary implementations, the quadrant may be defined using a predetermined time period. The predetermined time period may be pre-settable, pre-configured, and/or otherwise, pre-determined in any desired way for each quadrant and/or for one or more quadrants and/or for all quadrants. For example, a first quadrant may be associated with a brushing time period from 0 seconds to 30 seconds, second quadrant—with a brushing time period from 31 seconds to 60 seconds, third—from 61 seconds to 90 seconds, and fourth—from 91 seconds to 120 seconds. The time spent for brushing a quadrant can correspond to brushing all three sides of all or some of the teeth in that quadrant. In some exemplary implementations, the time allotted to each quadrant may be dependent on a number of teeth in that quadrant. Further, a user and/or a toothbrush apparatus and/or a computing device connectable to the toothbrush apparatus may be configured to define a specific time period for each of the quadrants.

In some exemplary implementations, the communications module 406 may be configured to a Bluetooth™ Low Energy (BLE) radio that may be compliant with the Bluetooth™ (e.g., v5.0 and/or lower/higher) specifications. The communications module 406 may be configured to transmit and/or receive data at 2.4 GHz and/or any other frequency. The communications module 406, using antenna module 412, may be configured to advertise while the toothbrush system 400 is not in an active connection with a smartphone. The toothbrush system 400 may advertise a unique Bluetooth™ ID and/or the unique ID of the toothbrush system 400. The unique ID of the toothbrush system 400 may be used to determine an owner of the toothbrush system 400 and their password, if any. In some exemplary implementations, the toothbrush system 400 may advertise even while the toothbrush system 400 is in a "sleep" mode. To ensure secure communications, the toothbrush system 400 may allow access to its Bluetooth™ services only if certain security protocols have been satisfied (e.g., if Mode 1, Level 2 security has been reached). The communication module 406 may be configured to support multiple Bluetooth™ services.

Figure 8:
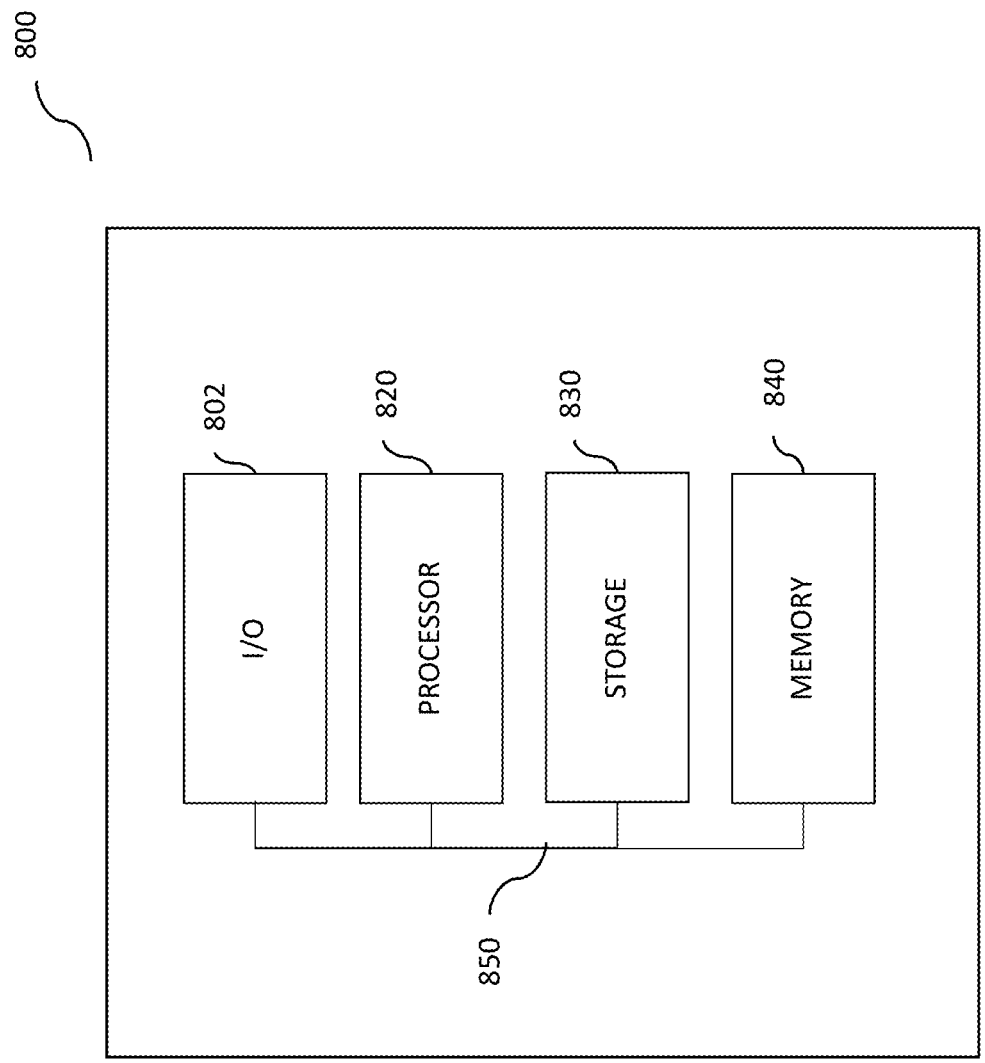
FIG. 8 illustrates an exemplary system, according to some implementations of the current subject matter.

In some implementations, the computing components (e.g., processing modules and/or processors, memory, etc.) of the toothbrush system 100 may be configured to be implemented in a system 800, as shown in FIG. 8. The system 800 may be incorporated into the toothbrush system 300 (shown in FIG. 3) and/or toothbrush system 400 (as shown in FIGS. 4A-B) in various ways and may include a processor 804, a storage device 806, a memory 808, and an input/output (I/O) device 802. Each of the components 802, 804, 806, and 808 may be interconnected using a system bus 810. The processor 804 may be configured to process instructions for execution within the system 800. In some implementations, the processor 804 may be a single-threaded processor. In alternate implementations, the processor 804 may be a multi-threaded processor. The processor 804 may be further configured to process instructions stored in the memory 808 or on the storage 806, including receiving or sending information through the I/O 802. The memory 808 may store information within the system 800. In some implementations, the memory 808 may be a computer-readable medium. In alternate implementations, the memory 808 may be a volatile memory unit. In yet some implementations, the memory 808 may be a non-volatile memory unit. The storage 806 may be capable of providing mass storage for the system 800. In some implementations, the storage 806 may be a computer-readable medium. In alternate implementations, the storage 806 may be a floppy disk device, a hard disk device, an optical disk device, a tape device, non-volatile solid state memory, or any other type of storage device. The I/O 802 may be configured to provide input/output operations for the system 800. In some implementations, the input/output device 802 may include a button, a touch screen, a keyboard, etc. In alternate implementations, the input/output device 802 may include a display unit for displaying graphical user interfaces.

In some implementations, the current subject matter relates to a toothbrush apparatus (e.g., similar to the toothbrush system shown in FIGS. 1-7). The toothbrush apparatus may include one or more sensing module(s), sensing element(s), and/or sensor(s) (which may incorporate one or more of the modules above, including but not limited to, the accelerometer 314, sensing module 404, and/or any other modules and/or any combination thereof shown in FIGS. 3-4B) configured to perform at least one of the following: detect at least one time period associated with use of the toothbrush apparatus, detect one or more movements of the toothbrush apparatus, determine position of the toothbrush, determine brushing intensity (e.g., using amplitude of the accelerometer), and any combination thereof, and one or more processors (e.g., processing modules 306, 402) communicatively coupled to the sensing module(s) and configured to determine one or more measurements based on at least one of: the one or more detected time periods, the one or more detected movements, one or more determined positions of the toothbrush, a number and/or length of one or more brushstrokes, one or more determined brushing intensities, and any combination thereof of the toothbrush apparatus, and store the one or more determined measurements in one or more memory locations (e.g., memory 308, 414, having an exemplary structure shown in FIG. 7) communicatively coupled to the one or more processors. The toothbrush apparatus may also include one or more communication modules (e.g., modules 406) configured to transmit/receive the data related to the measurements.

In some implementations, the current subject matter may include one or more of the following optional features. The toothbrush apparatus may also include a brush head (e.g., brush head 202), and a housing including an interchangeable motor module (e.g., module 204, 304, 410). The interchangeable motor module may include one or more power modules (e.g. module 320, 416), one or more memories (e.g., memory 308, 414), and the processors (e.g., processing module 306, 402).

In some implementations, the time periods may include at least one of the following: a start time for using the toothbrush apparatus, an end time for using the toothbrush apparatus, a length of time during which the toothbrush apparatus is being used, a number of times the toothbrush apparatus is used, a duration between at least two uses of the toothbrush apparatus, and any combination thereof. In some implementations, the sensing module may include at least one of the following: an accelerometer, a clock, a monitoring module, and any combination thereof. Further, the measurements may be separately determined for each user in a plurality of users of the toothbrush apparatus. Additionally, the measurements may include at least one of the following: a brushing intensity, a brushing pressure, one or more parameters associated with brushing movements, a location of the toothbrush apparatus in a mouth of a user during brushing, a coverage of brushing, and any combination thereof.

In some implementations, the measurements may be stored in the memory locations using a predetermined resolution in a compressed format. The measurements may be compared to one or more predetermined usage values. The predetermined usage values may include at least one of the following: a minimum length of time for a brushing, a maximum length of time for a brushing, a minimum length of time between brushings, a maximum length of time between brushings, a desired pressure exerted by bristles of a toothbrush head on the user's teeth and/or gums, a maximum level of motion of the toothbrush apparatus, a minimum level of motion of the toothbrush apparatus, a desired brushing coverage within regions of the user's mouth, a length of time of the toothbrush apparatus at particular regions, and any combination thereof.

In some implementations, the data may be collected, stored and/or transmitted automatically, at predetermined period of time, or after each use of the toothbrush apparatus. Further, the data may be collected, stored and/or transmitted based on a mode of operation of the toothbrush apparatus. The mode of operation may include at least one of the following: a low mode, a high mode, a soft mode, a whitening mode, a gentle mode, a firm mode, a communications mode, an advertising mode, and any combination thereof.

Figure 9:
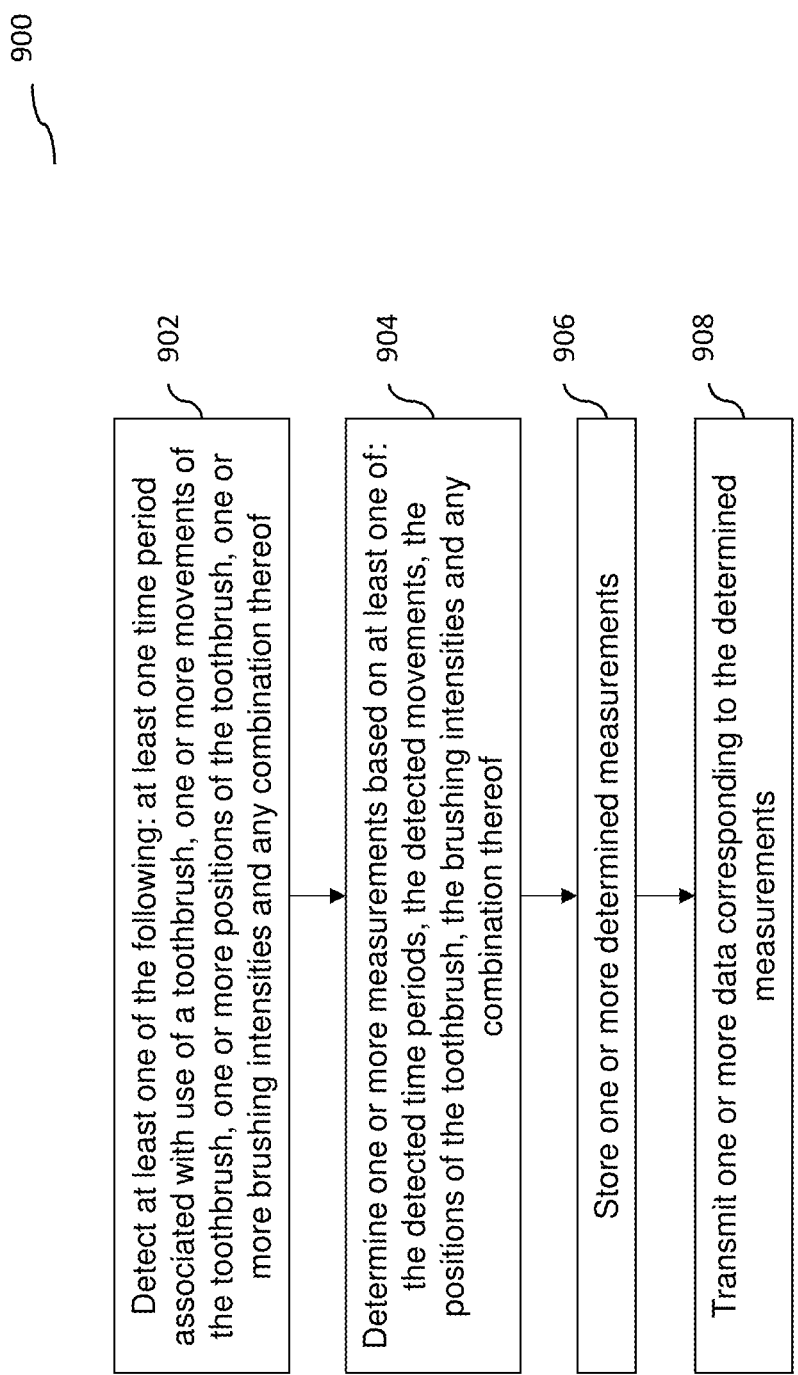
FIG. 9 illustrates an exemplary method, according to some implementations of the current subject matter.

FIG. 9 illustrates an exemplary method 900 for tracking, recording, and generating feedback of use of a toothbrush apparatus according to some implementations of the current subject matter. At 902, at least one time period associated with use of the toothbrush, one or more movements of the toothbrush, one or more positions of the toothbrush, one or more brushing intensities, and any combination thereof may be detected (e.g., using an accelerometer, etc.). At 904, one or more measurements may be determined (e.g., using processing modules 306, 402) based on at least one of: the detected time periods, the detected movements, the determined positions of the toothbrush, the determined brushing intensities, and any combination thereof, and stored in a memory location (e.g., memory 308, 414), at 906. At 908, the feedback signals may be transmitted (e.g., using transfer modules 324, communications module 406).

In some implementations, the current subject matter apparatus may be configured to include one or more modules that may detect and/or measure and/or determine a number of strokes in one or more axis (e.g., longitudinal axis and/or any other axis) of the toothbrush. This determination/measurement may be performed using one or more processors, sensing devices (e.g. accelerometers, pressure sensors, circuitry components (e.g., a low pass filter component), and/or any other components). This determination/measurement may be useful for determining brushing intensity that is being applied by the user (e.g., how vigorous the user is brushing) as well as determination of a time length of each brushstroke.

Figure 10:
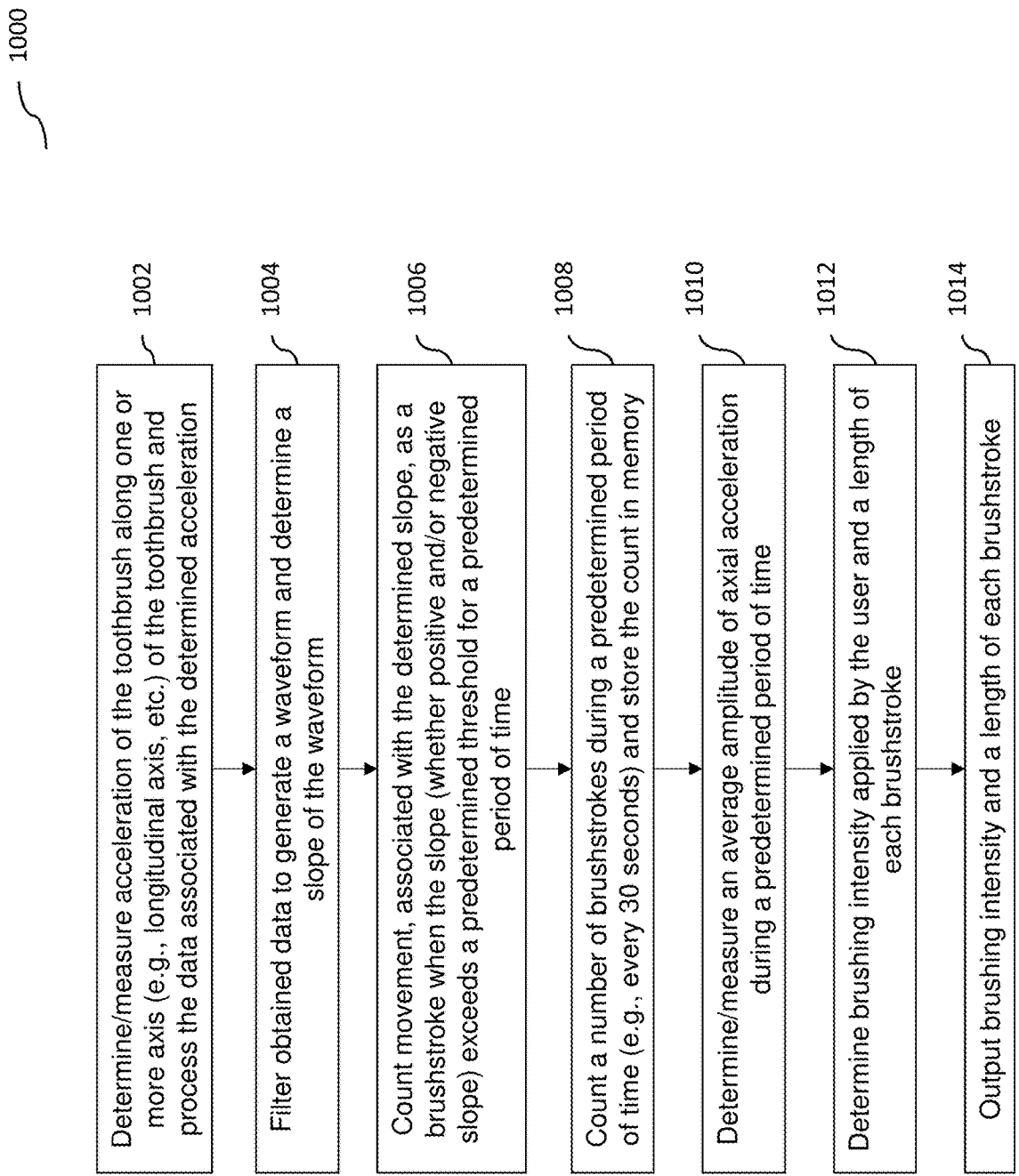
FIG. 10 illustrates another exemplary method, according to some implementations of the current subject matter.

FIG. 10 illustrates an exemplary process 1000 for determining a number of brushstrokes performed by the user and/or a time length of each brushstroke, according to some implementations of the current subject matter. At 1002, one or more sensing devices (e.g., accelerometer and/or any other circuitry) may be configured to determine/measure acceleration of the toothbrush along one or more axis (e.g., longitudinal axis, etc.) of the toothbrush and process the data associated with the determined acceleration.

At 1004, the obtained data may be filtered (e.g., using a low-pass filter that may be incorporated into the circuitry of the toothbrush) to generate a waveform. The data may also be used to determine a slope of the waveform. At 1006, upon determination that the slope (whether positive and/or negative slope) exceeds a predetermined threshold for a predetermined period of time, the apparatus may be configured to count movement, associated with the determined slope, as a brushstroke. At 1008, a number of brushstrokes may be counted during a predetermined period of time (e.g., every 30 seconds) and stored the count in memory.

In some implementations, at 1010, an average amplitude of axial acceleration (e.g., x-axis acceleration, y-axis acceleration, etc.) may be determined/measured during a predetermined period of time (e.g., for every 30 seconds). At 1012, based on the above data, the apparatus may be configured to determine brushing intensity that is being applied by the user and a length of each brushstroke. At 1014, the brushing intensity and time lengths of each brushstroke may be outputted (e.g., stored and/or transmitted to an external computing device).

In some implementations, the current subject matter relates to a medical system. The system may include a toothbrush apparatus, which may include a sensing module configured to perform at least one of the following: detect at least one time period associated with use of the toothbrush apparatus, detect one or more movements of the toothbrush apparatus, determine one or more positions of the toothbrush, determine a number and/or length of one or more brushstrokes, determine one or more brushing intensities, and any combination thereof. The system may also include one or more processors communicatively coupled to the sensing module and configured to determine one or more measurements based on at least one of: the one or more detected time periods, the one or more detected movements, the determined positions of the toothbrush, the determined number and/or length of one or more brushstrokes, the determined brushing intensities, and any combination thereof of the toothbrush apparatus, and store the determined measurements in one or more memory locations communicatively coupled to the processors and/or transmit the stored data related to the measurements.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. It will also be understood that when an element is referred to as being "connected" or "coupled" to another element, it can be directly connected or coupled to the other element or intervening elements may be present.

As stated above, the systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A toothbrush apparatus comprising:
an accelerometer arranged to detect an acceleration of the toothbrush apparatus along at least one axis during brushing;
one or more processors communicatively coupled to the accelerometer; and
a memory including a non-transitory computer-readable storage medium communicatively coupled to the one or more processors, the non-transitory computer-readable storage medium having stored thereon instructions for causing the one or more processors to
receive, from the accelerometer, a signal indicative of the acceleration, filter the signal to generate a waveform,
determine a slope of the waveform,
based on the slope of the waveform, count a number of brushstrokes during a predetermined time period, wherein the number of brushstrokes is counted when the slope exceeds a predetermined threshold value associated with a valid brushing motion,
store, in the memory, data including the number of brushstrokes.

2. The toothbrush apparatus of claim 1, wherein the instructions for causing the one or more processors to filter the signal to generate the waveform include instructions for causing the one or more processors to low-pass filter the signal indicative of acceleration of the toothbrush apparatus.

3. The toothbrush apparatus of claim 1, wherein the instructions for causing the one or more processors to count the number of brushstrokes during the predetermined time period include instructions for causing the one or more processors to count, as one of the number of brushstrokes, the slope exceeding a predetermined threshold for the predetermined time period.

4. The toothbrush apparatus of claim 1, wherein the predetermined time period is every 30 seconds.

5. The toothbrush apparatus of claim 1, wherein the non-transitory computer-readable storage medium has further stored thereon instructions for causing the one or more processors to determine brushing intensity based on the number of brushstrokes and to store the brushing intensity in the memory.

6. The toothbrush apparatus of claim 1, further comprising a communication module communicatively coupled to the memory and the one or more processors, wherein the communication module is configured to transmit, to one or more external computing devices, a feedback signal including the number of brushstrokes.

7. The toothbrush apparatus of claim 6, wherein the feedback signal based on the number of brushstrokes includes brushing intensity.

8. The toothbrush apparatus of claim 6, wherein the feedback signal includes time length of each brushstroke.

9. The toothbrush apparatus of claim 6, wherein the one or more processors are in electrical communication with a battery, and the feedback signal includes information related to the battery.

10. The toothbrush apparatus of claim 9, wherein the feedback signal includes a minimum battery voltage recorded over the predetermined time period.

11. The toothbrush apparatus of claim 9, wherein the feedback signal includes a battery voltage corresponding to a start of the predetermined time period.

12. The toothbrush apparatus of claim 6, wherein the communication module is configured to receive a request from the one or more external computing devices and to transmit the feedback signal to the one or more external computing devices in response to the request from the one or more external computing devices.

13. The toothbrush apparatus of claim 6, wherein the communication module is configured to receive a pre-set value for the predetermined time period.

14. The toothbrush apparatus of claim 6, wherein the communication module is configured to receive, from the one or more external computing devices, a reset signal to clear the data stored in the memory, and the non-transitory computer-readable storage medium has further stored thereon instructions for causing the one or more processors to clear the data stored in the memory based on the reset signal received by the communication module.

15. The toothbrush apparatus of claim 6, wherein the communication module is configured to transmit the feedback signal while power to one or more of the accelerometer or the one or more processors is off.

* * * * *